(12) United States Patent
Sodhi et al.

(10) Patent No.: US 10,805,585 B2
(45) Date of Patent: Oct. 13, 2020

(54) SYSTEM AND METHODS OR AUGMENTING SURFACES WITHIN SPACES WITH PROJECTED LIGHT

(71) Applicant: Lightform, Inc., San Francisco, CA (US)

(72) Inventors: Rajinder Sodhi, San Francisco, CA (US); Brett Jones, San Francisco, CA (US); Kevin Karsch, San Francisco, CA (US); Pulkit Budhiraja, San Francisco, CA (US); Phil Reyneri, San Francisco, CA (US); Douglas Rieck, San Francisco, CA (US); Andrew Kilkenny, San Francisco, CA (US)

(73) Assignee: Lightform, Inc., San Francisco, CA (US)

( * ) Notice: Subject to any disclaimer, the term of this patent is extended or adjusted under 35 U.S.C. 154(b) by 0 days.

(21) Appl. No.: 16/701,018

(22) Filed: Dec. 2, 2019

(65) Prior Publication Data
US 2020/0195900 A1 Jun. 18, 2020

Related U.S. Application Data

(60) Provisional application No. 62/834,296, filed on Apr. 15, 2019, provisional application No. 62/780,884, filed on Dec. 17, 2018.

(51) Int. Cl.
*H04N 9/31* (2006.01)
*H04N 13/00* (2018.01)
(Continued)

(52) U.S. Cl.
CPC ......... *H04N 9/3185* (2013.01); *H04N 9/3188* (2013.01); *H04N 13/271* (2018.05); *G10L 15/22* (2013.01); *G10L 2015/223* (2013.01)

(58) Field of Classification Search
CPC .. H04N 13/271; H04N 9/3185; H04N 9/3188; H04N 9/317; H04N 9/3122; G10L 15/22; G10L 2015/223; G06T 3/40; G06T 3/00; G06T 3/0018; G06T 3/0043; G06T 7/70; G06T 7/60; G06T 2207/10012;
(Continued)

(56) References Cited

U.S. PATENT DOCUMENTS 7,394,459 B2 * 7/2008 Bathiche ................. A63F 13/00
345/175
2017/0352192 A1 * 12/2017 Petrovskaya ............. G06T 7/77

* cited by examiner

*Primary Examiner* — Sherrie Hsia
(74) *Attorney, Agent, or Firm* — Run8 Patent Group, LLC; Peter Miller

(57) ABSTRACT

One variation of a method for augmenting surfaces within spaces with projected light includes: at a projector system during a first time period, projecting visual content onto nearby surfaces via a light projector integrated into the projector system and capturing a first scan of nearby surfaces, illuminated by the light projector, via an optical sensor integrated into the projector system; identifying a first space occupied by the projector system during the first time period based on features detected in the first scan; selecting a first augmented content source, from a first set of augmented content sources affiliated with the first space, associated with a first surface in the first space; articulating the light projector to locate the first surface in a field of view of the light projector; accessing a frame from the first augmented content source; and projecting the frame onto the first surface via the light projector.

20 Claims, 9 Drawing Sheets

(51) Int. Cl.
*H04N 13/271* (2018.01)
*G10L 15/22* (2006.01)

(58) Field of Classification Search
CPC . G06T 2207/10016; G06T 2207/10021; G06T 2207/30244; G09G 5/391
USPC ....... 348/42, 43, 46, 47, 580, 583, 744, 759; 382/154, 276, 293, 296, 297; 345/154, 345/276, 293, 296, 297
See application file for complete search history.

SYSTEM AND METHODS OR AUGMENTING SURFACES WITHIN SPACES WITH PROJECTED LIGHT

CROSS-REFERENCE TO RELATED APPLICATIONS

This application claims priority to U.S. Provisional Patent Application No. 62/780,884, filed on 17 Dec. 2018, and to U.S. Provisional Patent Application No. 62/834,296, filed on 15 Apr. 2019, each of which is incorporated in its entirety by this reference.

This application is related to U.S. patent application Ser. No. 16/447,792, filed on 20 Jun. 2019, which is a continuation of U.S. patent application Ser. No. 16/146,679, filed on 28 Sep. 2018, each of which is incorporated in its entirety by this reference.

TECHNICAL FIELD

This invention relates generally to the field of light projection and more specifically to a new and useful system for projecting spatially-referenced content within a space in the field of light projectors.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. System

Figure 1A:
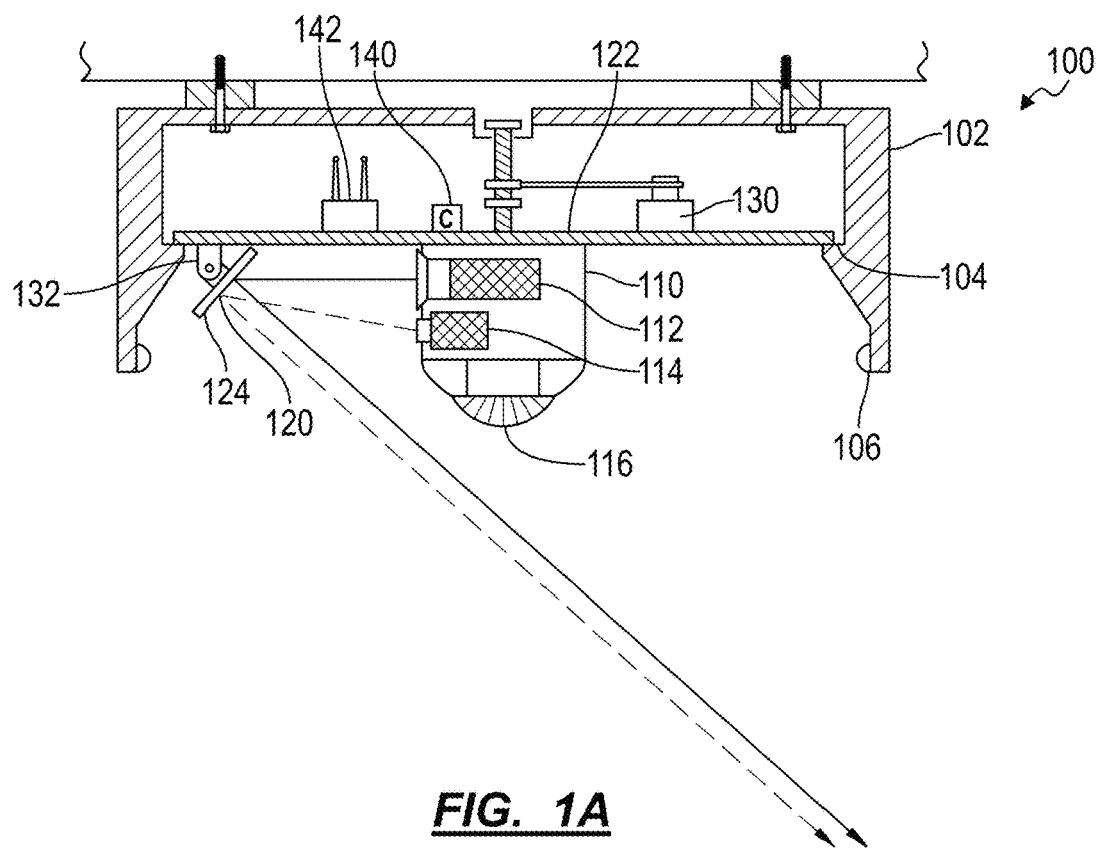
FIGS. 1A and 1B are schematic representations of a system.
Figure 1B:
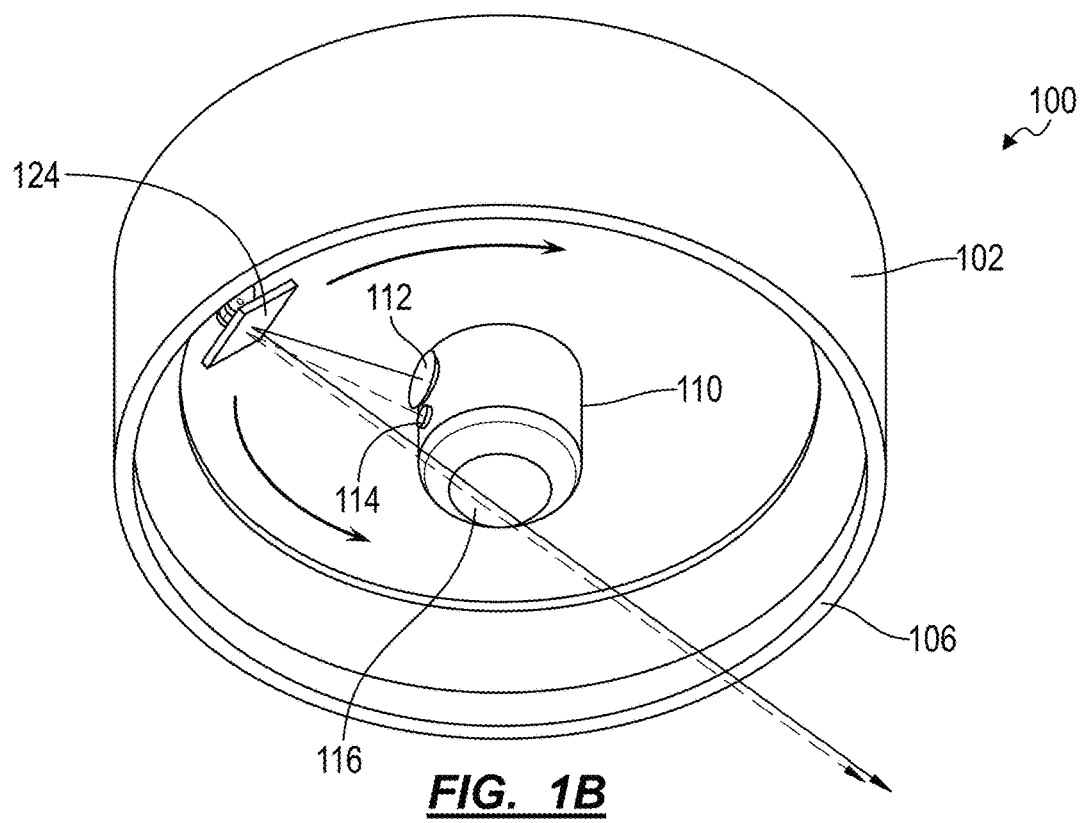

As shown in FIGS. 1A and 1B, a system 100 for projecting spatially-referenced content within a space includes: a housing 102; a projection assembly 110; a projection orientation subsystem 120; an azimuth actuator 130; and a controller 1400. The projection assembly 110 is arranged inside the housing 102 and includes: a light projector 112 defining a camera focal axis and defining a projector field of view; and a feedback camera 114 arranged adjacent the light projector 112, defining a camera focal axis offset from and approximately parallel to the projector focal axis, and defining a camera field of view that intersects the projector field of view. The projection orientation subsystem 120 is arranged inside the housing 102 and includes: a reflector support structure 122 coupled to and extending outwardly from the projection assembly 110; an outer reflector 124 defining a reflective surface, coupled to a distal end of the reflector support structure 122, and intersecting the projector field of view and the feedback camera 114 field of view; and an altitude actuator 132 coupled to the outer reflector 124 and configured to pivot the outer reflector 124 about a pitch axis of the reflector support structure 122. The azimuth actuator 130 is configured to rotate the projection assembly 110 and the projection orientation subsystem 120 about an azimuthal axis of the housing 102. The controller 140 is configured to: drive the altitude actuator 132 and the azimuth actuator 130 to a first position to locate the projector field of view and the feedback camera 114 field of view on a first surface within the space; serve a first frame including visual content associated with the first surface to the light projector 112 for projection onto the first surface at a first time; access a first image of the first surface recorded by the feedback camera 114 at approximately the first time; derive a three-dimensional representation of the first surface based on a difference in position of the visual content in the first frame and the visual content detected in the first image; and generate a second frame including the visual content warped to preserve perspective when projected onto the first surface according to the three-dimensional representation of the first surface.

1.1 Applications

Generally, the system 100 defines a light projection system configured to augment surfaces within a space with visual, projected-light content from various augmented content sources. The system 100 is also configured to be transiently located in and to augment surfaces within various spaces over time. For example, the system 100 can be transiently installed on a ceiling mount over a residential living room, and the system 100 can then: automatically identify its presence and relative location in this living room; access augmented content from various augmented content sources associated with the living room; project art animations (e.g., from an augmented art source) onto wall art in the living room; project album art (e.g., from a music streaming service linked to the stereo system and to the system 100) onto a wall over a stereo system in the living room; project rideshare status information (e.g., from a rideshare application executing on a mobile device linked to the system 100) onto a wall adjacent a doorway to the living room; and project board game content (e.g., from a gaming application linked to the system 100) onto a table in the living room. Later, the system 100 can be placed on a countertop in a kitchen, and the system 100 can then: automatically identify its presence and relative location in this kitchen; access augmented content from various augmented content sources associated with the kitchen; project recipe information (e.g., from a webpage accessed by the system 100) onto the countertop in the kitchen; project inbound call information (e.g., from a smartphone connected to the system 100) onto a wall in the kitchen; and project calendar event details of upcoming calendar events (e.g., from a online house calendar) onto a wall adjacent a doorway to the kitchen. Later still, the system 100 can be placed on a lamp base in a bedroom, and the system 100 can then: automatically identify its presence and relative location in this bedroom; access augmented content from various augmented content sources associated with the bedroom; project art animations (e.g., from an augmented art source) onto wall art in the bedroom; project yoga and meditation animations (e.g., from a yoga or meditation application linked to the system 100) onto a floor surface in the bedroom; and project visual alarm clock content (e.g., from an alarm clock application executing on a mobile device linked to the system 100) onto a ceiling over a bed in the bedroom.

Therefore, the system 100 can define a mobile (or fixed) light projector 112 system configured to: identify the space it currently occupies; access augmented content sources associated with surfaces in this space; selectively orient the projection assembly 110 and/or the projection orientation subsystem 120 to locate the field of view of the light projector 112 on select surfaces in the space previously associated with these augmented content sources; and selectively project augmented content from these augmented content sources onto these surfaces in order to augment this space—with passive visualizations predicted to be relevant or appealing to a user and/or with visualizations specifically requested by the user.

In particular, the system 100 can project visual content across various surfaces within a space by: rotating a light projector 112 and a reflective surface—that intersects the field of view of the light projector 112—about an azimuthal axis of the system 100 in order to pan the field of view of the light projector 112; and rotating the reflective surface in order to tilt the field of view of the light projector 112. The system 100 can therefore move the light projector 112 and the reflective surface in order to scan the field of view of the light projector 112 over a large, nearly-hemispherical volume, thereby enabling the light projector 112 to project visual content onto each surface in the space that falls within the line of sight of the system 100.

Figures 4A, 4B:
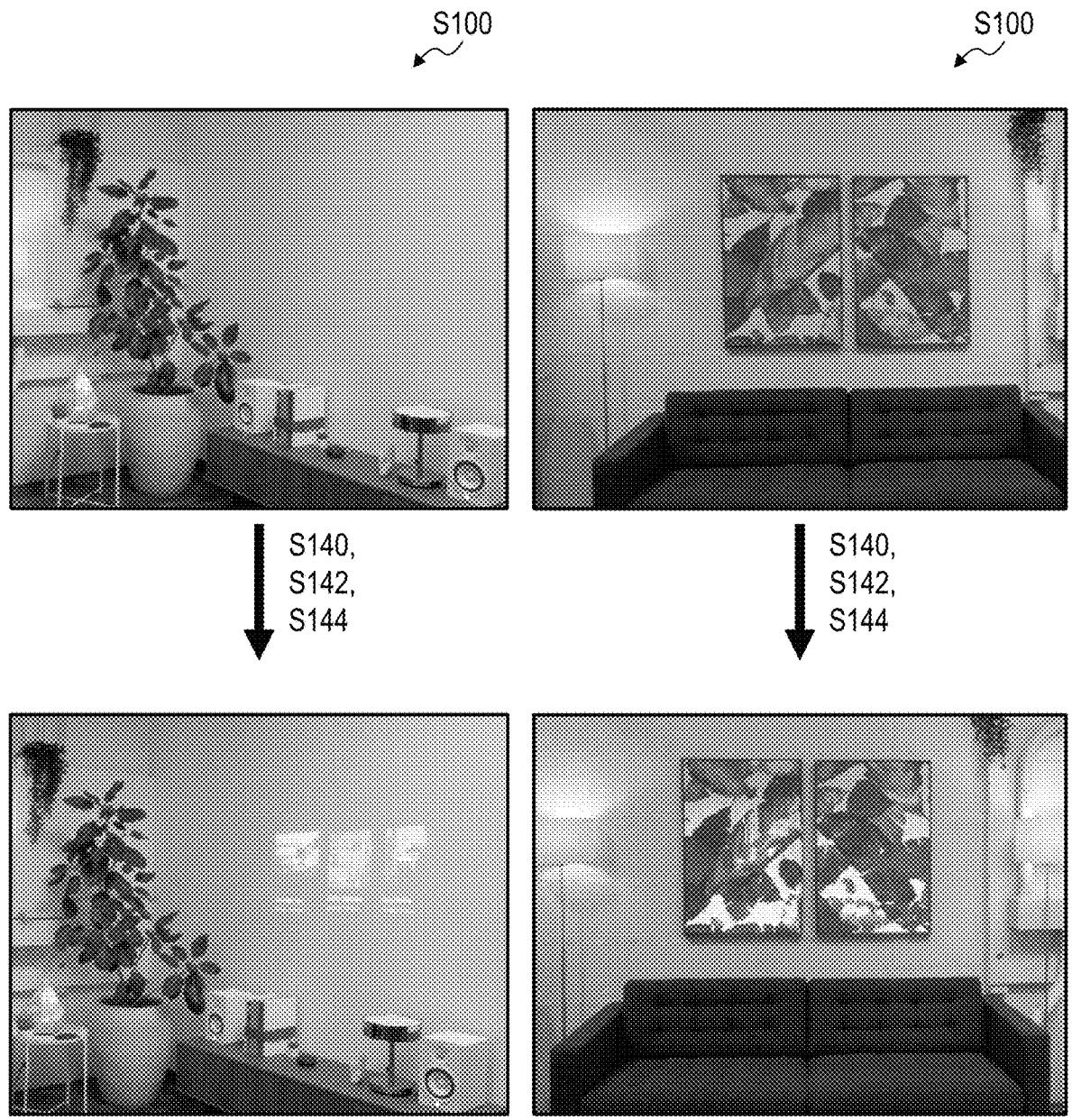
FIGS. 4A and 4B are flowchart representations of variations of the first method.
Figure 5:
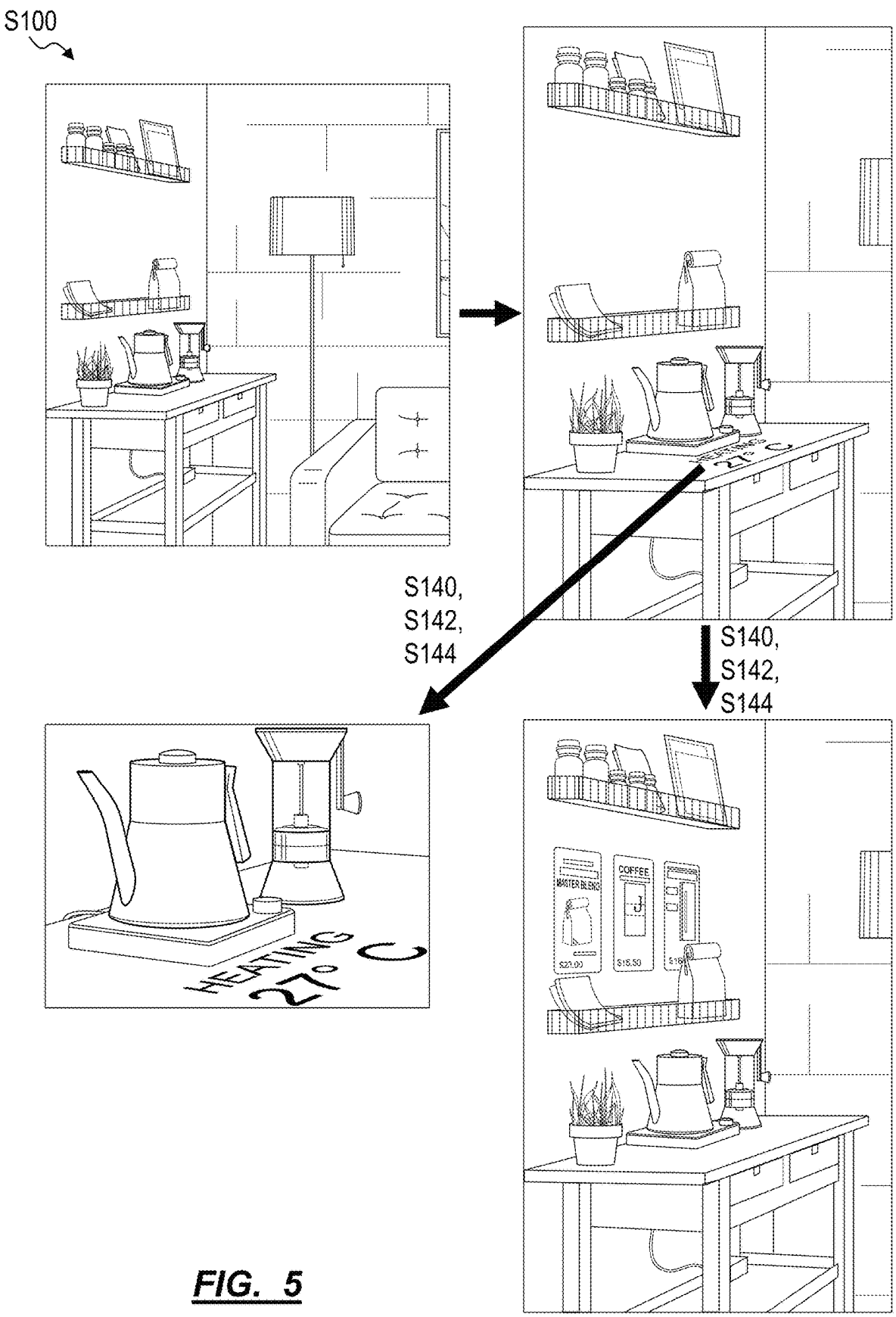
FIG. 5 is a flowchart representation of one variation of the first method.

Generally, different types and sources of visual content can be associated with different surfaces in the space, and the system 100 can: detect or receive a trigger for projecting visual content of a particular type and/or from a particular augmented content source into the space; identify a target surface in the space associated with this particular type of visual content and/or with this particular augmented content source; selectively adjust positions of the light projector 112 and the reflective surface in order to locate the field of view of the light projector 112 on the target surface in the space; and then serve a sequence of static or animated frames containing this visual content to the light projector 112, which then projects these frames onto the corresponding surface in the space. For example, the system 100 can store associations between: a wall area over a stereo system with a music catalog and album cover art from a music streaming service (shown in FIG. 4A); a wall area opposite a sofa with a video feed and video catalog from a video streaming service; a coaster located on a coffee table with a temperature of a wireless-enabled hot water kettle (shown in FIG. 5); an artwork hung on a wall with an artwork animation referenced to features of the artwork (shown in FIG. 4B); a street map hung on a wall with a planned route and driver status from a rideshare service; a face of a refrigerator located in the space with a grocery catalog and shopping cart from a grocery delivery service; a wall space over a coffee maker with a coffee catalog and shopping cart from the grocery delivery service (shown in FIG. 5); etc. The system 100 can thus project visual content received from these various sources onto corresponding surfaces in the space occupied by the system 100. The system 100 can also transition between projecting these visual content onto corresponding surfaces in the space based on voice commands from a user occupying or near the space, or based on content priority rules associated with these content sources, responsive to a change in the space (e.g., a user entering or leaving the space, such as detected by a context camera 116 integrated into the system 100, as described below).

The system 100 also includes a feedback camera 114 arranged adjacent and offset from the light projector 112 (hereinafter the "projector"), configured to move with the light projector 112, and defining a field of view that intersects the field of view of the light projector 112. Visual content cast onto a surface in the space by the light projector 112 can therefore fall into the field of view of the feedback camera 114. The system 100 can then implement stereoscopy techniques to interpret a three-dimensional profile of the surface based on known visual content projected onto the surface by the light projector 112, a perspective of this visual content represented in a concurrent image recorded by the feedback camera 114, known properties of the light projector 112 and the feedback camera 114, and a known offset between the light projector 112 and the feedback camera 114. The system 100 can therefore leverage known content cast onto the surface by the light projector 112, a concurrent image recorded by the feedback camera 114, and known characteristics and offsets between the light projector 112 and the feedback camera 114 to derive a three-dimensional representation of the surface in real-time. The system 100 can then modify frames served to the light projector 112 based on this three-dimensional representation of the surface in order to preserve a perspective of the visual content in these frames when cast onto this surface by the light projector 112.

The system 100 can additionally or alternatively project calibration images—via the light projector 112—onto surfaces in the space and implement similar methods and techniques to generate a three-dimensional representation of a constellation of surfaces in the space, such as during a hibernate period, a setup period, or when a human is not occupying the space. The system 100 can then leverage this three-dimensional representation of the space to modify frames served to the light projector 112 based on surfaces in the field of view of the light projector 112 over time in order to preserve perspectives of visual content in these frames when cast onto corresponding surfaces in the space. The system 100 can also implement similar methods and techniques to update this three-dimensional representation of the space over time, to re-register the projection assembly 110 and projection orientation subsystem 120 to features in the space, and/or to re-align visual content to features on corresponding spaces in real-time based on known visual content (or calibration frames) cast into the space by the light projector 112 and positions of these visual content detected in concurrent images recorded by the feedback camera 114.

Therefore, the system 100 can function to: model various horizontal, vertical, and three-dimensional surfaces within a space; and to augment the space by casting visual content of different types and from different sources onto these surfaces over time and responsive to various internal and external triggers.

1.2 Housing

Generally, the housing 102 is configured to enclose other components of the system 100 and to mount to a surface (e.g., a wall, a ceiling), to sit on a surface (e.g., a table, a floor), or transiently (i.e., temporarily) install on a stand (e.g., a lampstand) within a space. For example, the housing 102 can be configured to mount to a ceiling, such as with drywall anchors, or to install over a ceiling light socket in a vertical "ceiling" configuration. Additionally or alternatively, the housing 102 can be configured to install on a wall—such as in a horizontal "wall" configuration 90° offset from the vertical "ceiling" configuration—in order to cast visual content onto opposing walls, a floor, and a ceiling in the space. Similarly, the housing 102 can be configured for placement on a horizontal surface (e.g., a tabletop)—such as in an inverted "table" configuration 180° offset from the vertical "ceiling" configuration—in order to cast visual content onto nearby walls and the ceiling in the space. In another implementation, the housing 102 includes a receptacle or engagement feature configured to engage a corresponding feature on a stand, such as in the form of a table-lamp stand or a floor-lamp stand; in this implementation, the housing 102 can be installed on a stand in a vertical "stand" configuration.

Furthermore, the housing 102 can include a handle or other lifting feature configured to enable a user to carry the system 100 between different spaces and/or to enable the user to move the system 100 within a space, such as between different mounting configurations described above.

The system 100 can also include a light element 106—such as an LED ring—arranged in the housing 102 configured to illuminate a space occupied by the system 100 when the light projector 112 is inactive. The controller 140 can also dim or disable the light element 106 when the light projector 112 is active in order to dim illumination of the space and thus yield greater contrast between surfaces in the space and visual content projected onto these surfaces.

1.3 Projection Assembly

The projection assembly 110 includes a light projector 112 and a feedback camera 114 paired with the light projector 112.

1.3.1 Light Projector

The light projector 112 is configured to render frames received from the controller 140 and to project these frames—in the form of two-dimensional color projections—toward the outer reflector 124, which then reflects these frames onto an opposing surface. For example, the light projector 112 can include: a DLP (digital light processing) projector or a LCD (liquid crystal display) projector; and a lamp-based or laser-based light source. The light projector 112 can also support color (e.g., RGB or CMYK), grayscale, or black-and-white light projection.

In one variation, the light projector 112 also includes a mechanical zoom controlled by a zoom actuator (e.g., a servo motor) via commands output by the controller 1400. However, the system 100 can include a projector of any other type.

1.3.2 Feedback Camera

The feedback camera 114 is mounted adjacent the light projector 112, defines a field of view that intersects the field of view of the light projector 112 (at some distance from the feedback camera 114) and defines a focal axis approximately parallel and offset from the focal axis of the light projector 112 (e.g., the focal axis of the light projector 112 optics and mechanical zoom). For example, the feedback camera 114 can include a color (e.g., RGB) CMOS or CCD camera.

In one variation, the feedback camera 114 also includes an active mechanical zoom, such as similar to and/or controlled by the same zoom actuator as the light projector 112 mechanical zoom. Alternatively, the feedback camera 114 can include fixed optics and can define a field of view that fully contains (and extends minimally beyond) the field of view of the light projector 112 at a lowest mechanical zoom setting of the light projector 112 mechanical zoom. In this implementation, the controller 140 can crop and expand an image recorded by the feedback camera 114 based on the mechanical zoom setting of the light projector 112 at the time the image was recorded in order to scale a scene represented by the image to the concurrent frame projected into the space by the light projector 112 (i.e., to match the field of view of the feedback camera 114 to the concurrent field of view of the light projector 112).

1.4 Projection Orientation Subsystem

The projection orientation subsystem 120 is configured to redirect the fields of view of the light projector 112 and the feedback camera 114 throughout a space occupied by the system 100.

1.4.1 Reflector Support Structure and Outer Reflector

The projection orientation subsystem 120 includes: a reflector support structure 122 coupled to the light projector 112 and feedback camera 114 and extending approximately parallel to and offset from the focal axis of the light projector 112; and an outer reflector 124 located within the fields of view of the light projector 112 and the feedback camera 114 and offset outwardly from the light projector 112 and the feedback camera 114. In one implementation, the reflector support structure 122 includes a beam, such as a carbon fiber or aluminum boom cantilevered outwardly from the light projector 112 and feedback camera 114 assembly; and the outer reflector 124 is coupled to a distal end of the boom.

The outer reflector 124 can include a flat mirror configured: to reflect light output by the light projector 112 toward an opposing surface in the space; and to reflect light from a surface in the space—that intersects light cast onto the surface by the light projector 112—back into the feedback camera 114.

Alternatively, the outer reflector 124 can include a convex mirror configured to expand the fields of view of the light projector 112 and feedback camera 114 over a larger area of a surface in the space, thereby enabling the light projector 112 to cast larger visual content onto a nearer surface in the space and enabling the feedback camera 114 to image this nearer surface. In particular, the outer reflector 124 can include a convex mirror that casts a smaller field of view of the light projector 112 onto a larger area in the space than a flat mirror, thereby: enabling the light projector 112 to define a smaller (in area) field of view, output a smaller image onto the outer reflector 124, and/or include smaller optics; enabling the feedback camera 114 to similarly define a smaller (in area) native field of view but to detect a larger area of the space with smaller optics; and thus enabling a smaller package size for the reflector, the light projector 112, the feedback camera 114, and the housing 102 overall.

1.4.2 Altitude Actuator and Altitude Sensor

The projection orientation subsystem 120 also includes an altitude actuator 132 configured to pivot the outer reflector 124 about a pitch axis of the reflector support structure 122, thereby tilting the fields of view of the light projector 112 and the feedback camera 114 vertically relative to the housing 102. For example, the altitude actuator 132 can include a servo, stepper, or DC gearhead motor.

In one implementation, the altitude actuator 132 is located remotely from the outer reflector 124 and is coupled to the outer reflector 124 with a timing belt or gearbox and driveshaft in order to limit weight cantilevered at the end of the reflector support structure 122. Additionally or alternatively, the housing 102 can define a circular bearing surface 104 concentric with the azimuthal axis of the housing 102. The distal end of the reflector support structure 122 can run along this circular bearing surface 104 as the azimuth actuator 130 described below rotates the projection assembly 110 and the reflector support structure 122 about the azimuth axis of the housing 102; and the circular bearing surface 104 can vertically support the distal end of the reflector support structure 122 against vertical deflection due to gravity and motion of the projection assembly 110.

The projection orientation subsystem 120 can also include an altitude sensor (e.g., a rotary encoder) coupled to the outer reflector 124 and configured to output a signal representing the absolute angular altitude position of the outer reflector 124 relative to a reference position on the reflector support structure 122. Alternatively, the altitude sensor can output a signal corresponding to relative changes in angular altitude position of the outer reflector 124 relative to the reflector support structure 122. The controller 140 can thus implement closed-loop controls to drive the altitude actuator 132 to target angular altitude positions based on outputs to the altitude sensor.

1.5 Azimuth Actuator and Azimuth Sensor

The system 100 also includes an azimuth actuator 130 configured to rotate the projection assembly 110 and the projection orientation subsystem 120—as a unit—about an azimuthal axis (or "yaw" axis) of the housing 102, thereby panning the fields of view of the light projector 112 and the feedback camera 114 horizontally relative to the housing 102. For example, the projection assembly 110 and the projection orientation subsystem 120 can be mounted to a platen supported on a thrust bearing concentric with the azimuthal axis of the housing 102; and a rotary output of the azimuth actuator 130 (e.g., including a servo, stepper, or DC gearhead motor) can be coupled to the platen via a timing belt or gearbox.

The system 100 can also include an azimuth sensor (e.g., a rotary encoder) coupled to the platen and configured to output a signal representing the absolute angular azimuthal position of the projection assembly 110 relative to a reference position on the housing 102. Alternatively, the azimuth sensor can be configured to output a signal corresponding to relative changes in angular azimuthal position of the outer reflector 124 relative to the housing 102. The controller 140 can thus implement closed-loop controls to drive the azimuth actuator 130 to target angular azimuth positions based on outputs to the azimuth sensor.

Therefore, in this implementation, the azimuth actuator 130 can rotate the projection assembly 1100 and the projection orientation subsystem 120 as one unit about the azimuthal axis of the housing 102 in order to sweep the fields of view of the light projector 112 and feedback camera 114—reflected toward an opposing surface by the outer reflector 124—horizontally about a space; and the altitude actuator 132 can pivot the outer reflector 124 about the pitch axis of the housing 102 in order to sweep the fields of view of the light projector 112 and feedback camera 114—reflected off of the outer reflector 124—vertically about a space. The controller 140 can thus locate the fields of view of the light projector 112 and the feedback camera 114 throughout a range of azimuthal and altitudinal positions in order to cast content from the light projector 112 onto floor and wall surfaces (and other horizontal, vertical, and three-dimensional surfaces) within the space and to track projection of this visual content into the space via concurrent images recorded by the feedback camera 114.

1.6 Variation: Reflector Support Structure

In one variation shown in FIG. 1A, rather than a beam, the reflector support structure 122 includes a plate or platen, and the light projector 112 and feedback camera 114 are mounted to the platen. In this variation: the platen can define an opening near its perimeter; the outer reflector 124 can be mounted to the platen adjacent (and passing through) the opening; the reflector actuator can be mounted to the platen, such as adjacent the outer reflector 124 or remotely from the outer reflector 124 and coupled to the outer reflector 124 via a timing belt, driveshaft, etc.; and the azimuth actuator 130 can rotate the platen in order to pan the fields of view of the light projector 112 and the feedback camera 114 about the azimuthal axis of the housing 102. Furthermore, in this variation, the perimeter edge of the platen can run along a circular bearing surface 104 defined along an interface face of the housing 102; and this circular bearing surface 104 can thus support the perimeter of the platen in order to preserve alignment between the outer reflector 124 and the projection assembly 110 over a range of operating speeds and angular azimuthal positions of the platen.

1.7 Variation: Context Camera

In one variation, the system 100 further includes a context that: faces downwardly from the housing 102; defines a wide field of view configured to span a large proportion of a space below the housing 102; and records images that enable the controller 140 to detect objects (e.g., people) entering and exiting the space and to generally detect presence of other mutable and immutable objects in the space.

In one example, the context camera 116 includes a color camera with a wide-angle lens and is mounted within the housing 102 such that a focal axis of the context camera 116 is approximately parallel to and aligned with the azimuthal axis of the housing 102. In this example, the context camera 116 can define a wide field of view such that, when the housing 102 is mounted near the center of an eight-foot-tall ceiling in a twelve-foot-square room, the field of view of the context camera 116 includes the full extent of the floor in this room and extends up walls of the room to a maximum height of six feet.

In one implementation, the context camera 116 is fixedly mounted to the housing 102. In this implementation, a coordinate system of the housing 102 can be defined relative to (e.g., aligned with) the image sensor in the context camera 116; and the azimuth sensor can output an absolute angular azimuthal position of the projection assembly 110 relative to this coordinate system defined according to the position of the context camera 116.

In another implementation, the context camera 116 is coupled to the projection assembly 110 and rotates about the azimuthal axis of the housing 102 with the light projector 112 and feedback camera 114. In this implementation, the position of the field of view of the context camera 116 may therefore change as the azimuth actuator 130 rotates the projection assembly 110. Accordingly, during operation, the controller 140 can: trigger the context camera 116 to record and timestamp a global image (or otherwise receive a timestamped global image from the context camera 116); record or access an angular azimuthal position of the projection assembly 110—relative to a coordinate system of the housing 102—at the time associated with the global image; and virtually rotate the image by this angular azimuthal position in order to align the global image to the coordinate system of the housing 102 before detecting mutable and immutable objects depicted in this global image.

1.8 Variation: Fixed Projector and Feedback Camera

In one variation, the projection assembly 110 is fixedly arranged in the housing 102. In this variation, the projection assembly 110 can face downwardly approximately parallel and adjacent the azimuth axis of the housing 102, and the system 100 can further include a center reflector. The center reflector: can be coupled to the reflector support structure 122 described above; can be arranged below the light projector 112 and feedback camera 114; can intersect the fields of view of the light projector 112 and feedback camera 114; and can project the fields of view of the light projector 112 and feedback camera 114 toward the outer reflector 124 offset from the azimuthal axis of the housing 102. The outer reflector 124 can then project these fields of view—incident from the center reflector—into the space.

In this variation, the altitude actuator 132 can pivot the outer reflector 124 about the pitch axis of the reflector support structure 122 in order to tilt the fields of view of the light projector 112 and the feedback camera 114 vertically within a space, as described above. Furthermore, the azimuth actuator 130 can rotate the center reflector, the reflector support structure 122, and the outer reflector 124 (and the altitude actuator 132) above the azimuthal axis of the housing 102 in order to pan the fields of view of the light projector 112 and the feedback camera 114 horizontally within the space.

However, in this variation, rotation of the center reflector relative to the light projector 112 may cause the field of view of the light projector 112 to rotate about a ray extending normally from the outer reflector 124 into the field below, therefore rotating content projected onto a surface in the space as a function of angular azimuthal position of the center reflector. Therefore, to counter rotation of content cast into the space by the light projector 112 during a next projection cycle, the controller 140 can: read a current angular azimuthal position of the center reflector—relative to the light projector 112 (e.g., relative to a coordinate system aligned to the light projector 112)—from the azimuthal sensor; calculate an angular offset from this angular azimuthal position to a reference position in which a vector between the center and outer reflectors is parallel to a y-axis of the light projector 112; rotate a next frame in equal and opposite to this angular offset; and then serve this corrected frame to the light projector 112 for projection toward the center reflector, which cooperates with the outer reflector 124 to cast this frame into the space. In this implementation, the controller 140 can similarly rotate an image—recorded concurrently by the feedback camera 114—equal and opposite to this angular offset in order to maintain alignment between the frame output by the light projector 112 and the concurrent image recorded by the feedback camera 114 and depicting projection of this content onto a surface in the space.

1.9 Variation: Biaxial Mirror Articulation

In another variation, the light projector 112 and the feedback camera 114 are fixedly coupled to the housing 102; and the mirror is supported on the housing 102 with the focal axis of the light projector 112 and the feedback camera 114 intersecting the mirror and is configured to rotate in two degrees of freedom (e.g., to pitch and yaw relative to the housing 102). For example, the mirror can be mounted to the housing 102 directly via an altitude actuator 132 and an azimuth actuator 1300. The controller 140 can therefore manipulate the altitude actuator 132 and the azimuth actuator 130 in order to move the mirror relative to the light projector 112 and feedback camera 114, thereby scanning the fields of view of the light projector 112 and feedback camera 114 within a conical zone extending horizontal from the housing 102 opposite the mirror.

1.10 Variation: Optically-Aligned Projector and Feedback Camera

In another variation, the feedback camera 114 is optically aligned with the light projector 112 via a 45° half-mirror or other beam-splitter arrangement, thereby substantially eliminating offset between the feedback camera 114 and the light projector 112. In this variation, the controller 140 can implement structure from motion or other photogrammetric range imaging techniques to transform images recorded by the feedback camera 114—while moving the mirror and/or projection assembly 110 relative to the housing 102—to generate a 3D map of the field.

1.11 Variation: Stereo Feedback Camera

In other variation, the feedback camera 114 includes a stereo camera and optics that are large enough to detect and follow a user moving within the field.

1.12 Controller and Supporting Equipment

The system 100 further includes a controller 140 configured to execute methods and techniques described above and below in order: to cast visual content into a space; to monitor visual quality of these content, alignment of these content to other features in the space; to detect context of the space and changes within the space; and to model three-dimensional surfaces within the space based on frames output by the light projector 112 and concurrent images recorded by the feedback camera 114.

The system 100 can also include a power supply, such as configured to connect to a 120 VAC outlet or ceiling light socket and to regulate this power down to 12 VDC. The system 100 can further include a wireless communication module 142 configured to download visual content from external sources, such as a nearby voice-controlled personal assistant, a nearby mobile device (e.g., a smartphone), or a remote computer system.

The system 100 can further include a microphone coupled to the controller 140, and the controller 140 can support voice-enabled interactions. For example, the controller 140 can execute voice-controlled personal assistant functions based on audible signals detected via the microphone, including projecting content orally requested by a user onto corresponding surfaces in the field.

In one implementation in which the context camera 116 is coupled to and rotates with the projection assembly 1100, the controller 140, the wireless communication module 142, and the azimuth actuator 130 are also arranged adjacent and rotate with the projection assembly 110 relative to the housing 102. In this implementation, the power supply is arranged in the housing 102 remotely from the controller 140; and a two-channel (e.g., Vcc and ground) power ring—arranged concentrically with the azimuthal axis of the housing 102—communicates power from the power supply to the projection assembly 110. The azimuth actuator 130 can therefore rotate the context camera 116, the projection assembly 110, the controller 140, and the wireless communication module 142 continuously about the azimuthal axis of the housing 102.

In another implementation, the controller 140, the wireless communication module 142, and the context camera 116 are fixedly mounted within the housing 102; and the controller 140 and the power supply are coupled to the projection assembly 110 via a ribbon cable and/or via a power ring. In this implementation, the azimuth actuator 130 can thus rotate the projection assembly 110 within approximately one azimuthal rotation (e.g., 400°).

However, the system 100 can include these components arranged and integrated in any other way.

2. First Method

Figure 3A:
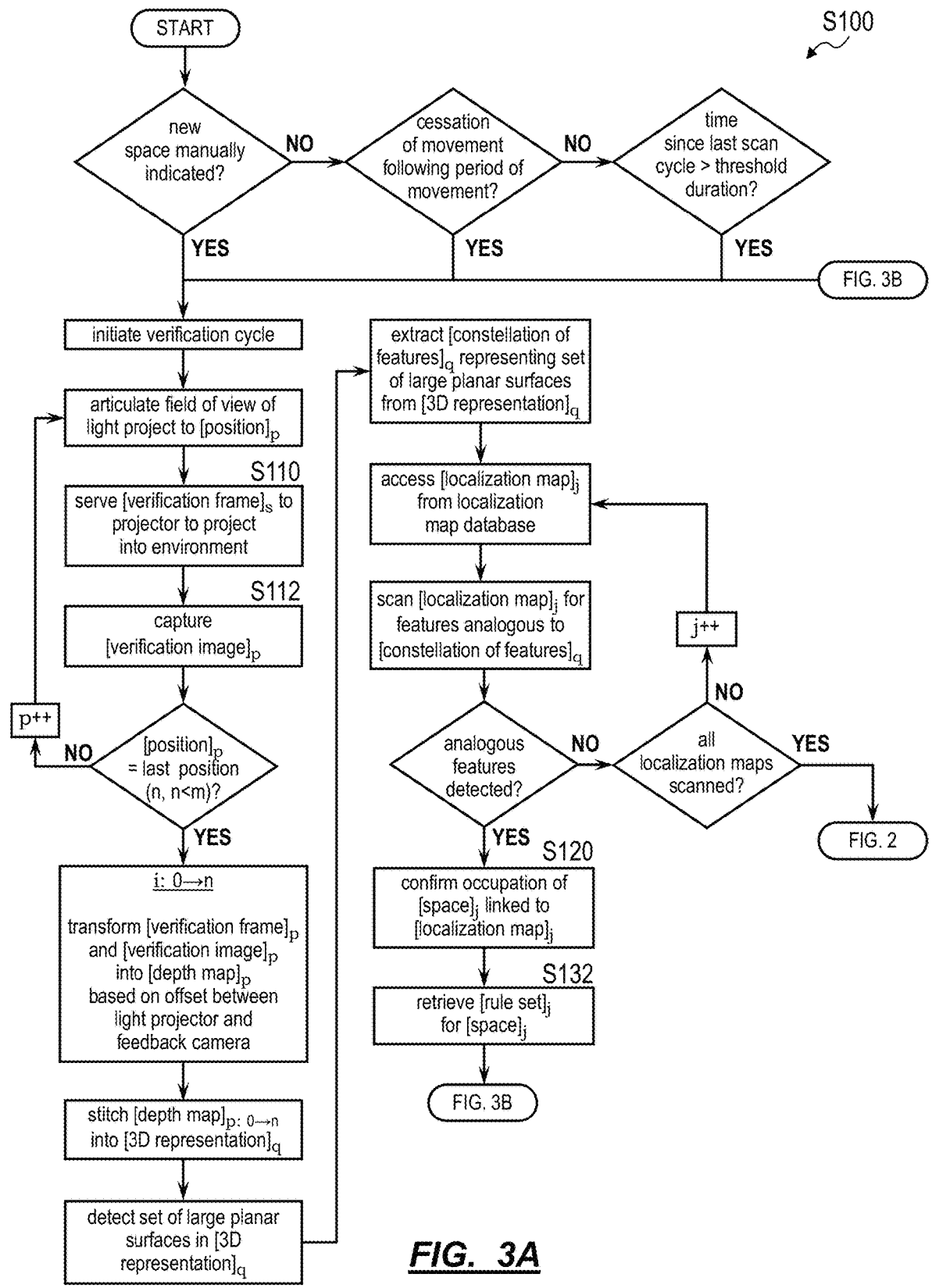
FIGS. 3A and 3B are flowchart representations of one variation of the first method.
Figure 3B:
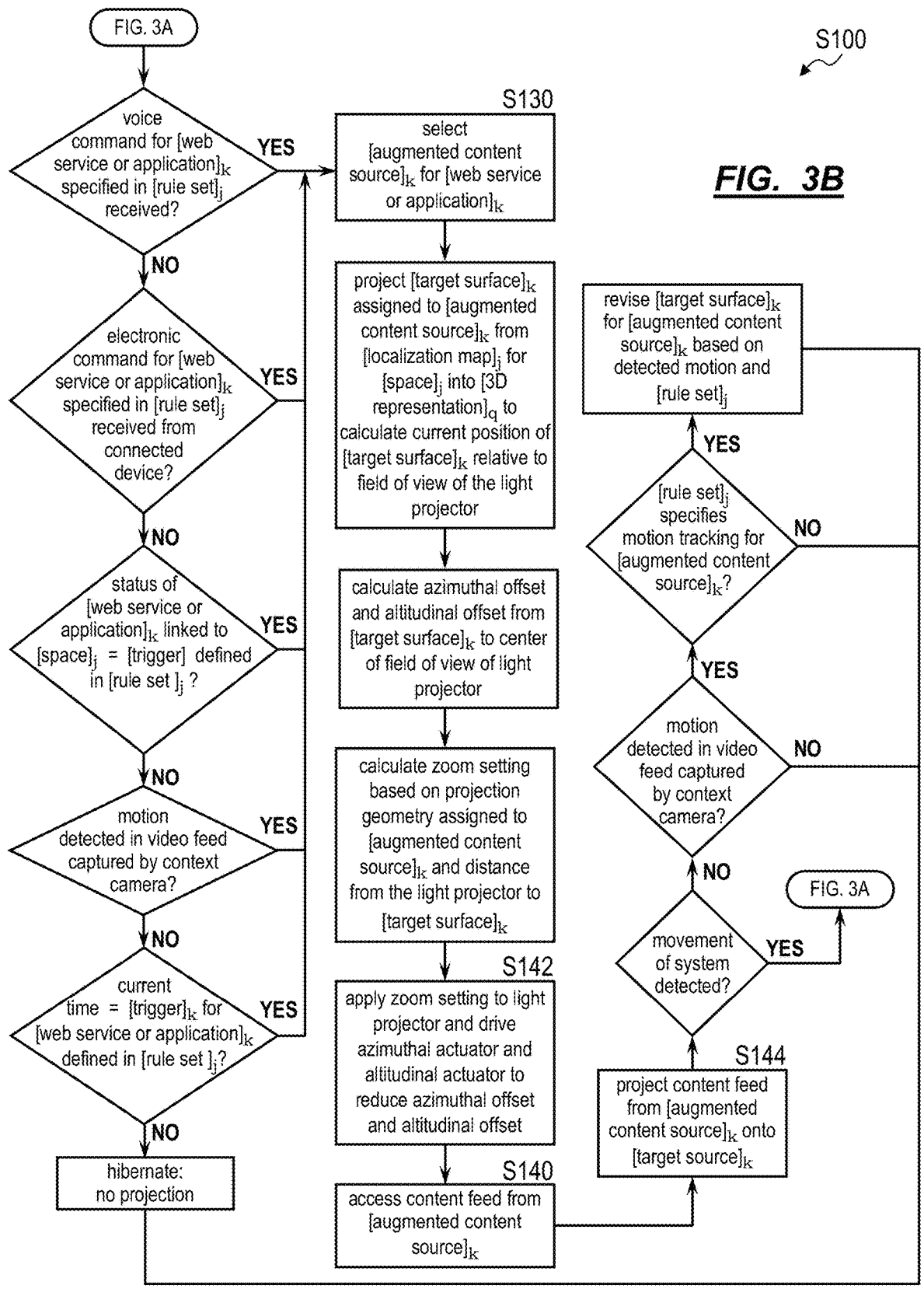

As shown in FIGS. 3A and 3B, a first method S100 for augmenting surfaces within spaces with projected light includes, at a projector system during a first time period: projecting visual content onto nearby surfaces via a light projector integrated into the projector system in Block S110; and capturing a first scan of nearby surfaces, illuminated by the light projector, via an optical sensor integrated into the projector system in Block S112. The first method S100 also includes: identifying a first space occupied by the projector system during the first time period based on features detected in the first scan in Block S120; selecting a first augmented content source, from a first set of augmented content sources affiliated with the first space, associated with a first surface in the first space in Block S130; articulating the light projector to locate the first surface in a field of view of the light projector in Block S140; accessing a first frame from the first augmented content source in Block S142; and projecting the first frame onto the first surface via the light projector in Block S144.

One variation of the first method S100 further includes, during a second time period: projecting visual content onto nearby surfaces via the light projector in Block S110; capturing a second scan of nearby surfaces, illuminated by the light projector, via the optical sensor in Block S112; identifying a second space, distinct from the first space, occupied by the projector system during the second time period based on features detected in the second scan in Block S120; selecting a second augmented content source, from a second set of augmented content sources affiliated with the second space, associated with a second surface in the second space in Block S130; articulating the light projector to locate the second surface in the field of view of the light projector in Block S140; accessing a second frame from the second augmented content source in Block S142; and, at the projector system, projecting the second frame onto the second surface via the light projector in Block S144.

2.1 Applications

Generally, the first method S100 can be executed by the system 100 to: scan nearby surfaces; automatically identify the space it currently occupies based on data collected during this scan; retrieve a set of rules—specifying augmented content sources, surfaces linked to these augmented content sources, and triggers for selectively projecting visual content from these augmented content sources—assigned to this space; and then automatically augment surfaces in this space with content from these augmented content sources according to these rules.

2.2 Space Calibration and Localization Map

Figure 2:
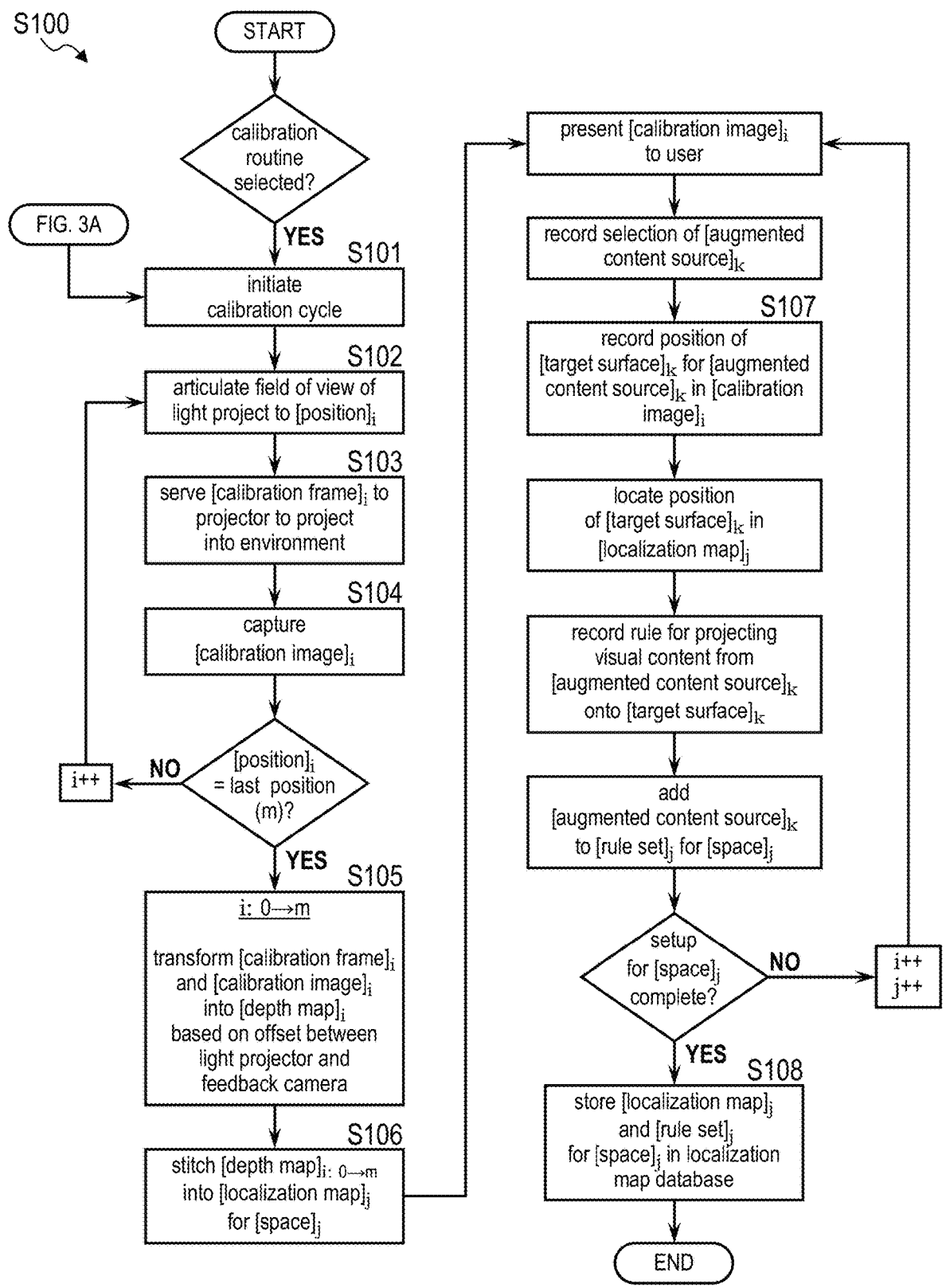
FIG. 2 is a flowchart representation of a first method.

In one variation shown in FIG. 2, the system 100 (e.g., the controller) executes a calibration routine to calibrate the system 100 to a new space and to generate a three-dimensional representation of the space (e.g., a high-definition "localization map" in the form of a 3D point cloud), such as when the system 100 is first placed in a space, during down periods (e.g., from 3 AM to 4 AM every night, once per week, or once per month) when a human is not detected in the space (e.g., when the control detects absence of a human in a global image recorded by the context camera), or when manually triggered by a user (e.g., via a button on the system 100 or via a smartphone or other computing device connected to the system 100). The system 100 can then store this localization map of the space as a master reference of the space and can interface with a user—such as described below—to link surfaces represented in this localization map to augmented content sources and to define rules for augmenting corresponding real surfaces in the space with visual content from these augmented content sources. Later, the system 100 can verify its presence in this same space based on alignment between: a constellation of features extracted from a later scan captured by the system 100; and a set of analogous features represented in this localization map of the space.

2.2.1 Pixel Correspondence Map and Disparity Map

In one implementation, the controller: drives altitude and azimuth actuators to locate fields of view of the light projector and the feedback camera in a first scan position; and implements auto-focus techniques described below to focus the light projector and the feedback camera. The controller then executes a pixel correspondence routine described in U.S. patent application Ser. No. 16/146,679—which is incorporated in its entirety by this reference—to: map a field of view of a pixel in the light projector to a field of view of a pixel in the feedback camera for each pixel in the light projector; generate a first pixel correspondence map according to the projector-to-camera pixel correspondences; and generate a first disparity map (which may represent distance from the feedback camera to surfaces in the field of view of the feedback camera in this first scan position) for surfaces in the fields of view of the projection assembly in this first scan position. The controller can then: drive the altitude and azimuth actuators to locate fields of view of the light projector and the feedback camera in a second scan position offset from the first scan position; repeat the foregoing process to generate a second pixel correspondence map and a second disparity map for the second scan position; and further repeat this process for each other scan position in a predefined set of scan positions.

For example, the controller can execute this process to generate one pixel correspondence map and one disparity map for each unique combination of pitch and yaw angles of the outer reflector, including: pitch angles from 0° to 90° in 5° increments; and yaw angles from 0° to 365° in 5° increments. Alternatively, the controller can implement variable altitude and azimuth increments between scan positions, such as a function of depth (e.g., proportional to distance) to predominant a surface (e.g., a largest surface above a ground plane) in the field of view of the projection assembly in adjacent scan positions. In this example, the controller can implement larger pitch and yaw increments responsive to detecting shorter distances from the projection assembly to predominant surfaces in the fields of view of the projection assembly; and vice versa.

The controller can therefore generate a set of spatially-referenced pixel correspondence maps and disparity maps during a calibration routine. The controller (or a remote computer system or other device) can then compile these disparity maps into one 3D representation of the space occupied by the system 100. For example, the controller can stitch disparity maps together based on associated pitch and yaw positions of the outer reflector in order to form a 3D map of surfaces within the space, such as in the form of a triangulated point cloud.

Furthermore, the controller can identify (and label) a ground plane in the 3D map. For example, the controller can identify coplanar surfaces spanning the greatest extent of the 3D map as a group plane. In a similar example, the system 100 can further include an accelerometer or IMU. The controller can thus: calculate a direction of gravity relative to the housing based on an output of the accelerometer or IMU; project a vector parallel to gravity into the 3D map; isolate a subset of surfaces in the 3D map that are normal to the gravity vector; identify groups of coplanar surfaces normal to gravity; identify a lowest group of coplanar surfaces normal to gravity as representing a floor surface; and calculate a ground plane that intersects this group of coplanar surfaces.

The system 100 can then compile these correspondence maps and disparity maps into a localization map of this space.

2.2.2 Variation: Depth Map

In another implementation shown in FIG. 2, the controller stores: known optical characteristics of both the light projector and the feedback camera; known optical pathways from the light projector and the feedback camera to the outer reflector; and a known offset between the light projector and the feedback camera. Therefore, rather than generate a pixel correspondence map and a disparity map that approximates depth of surfaces in the space, the system 100 can instead implement similar stereoscopy methods and techniques to calculate a first depth map of surfaces within the fields of view of the light projector and the feedback camera—when occupying a first scan position—based on these known optical characteristics, optical pathways, and offsets and correspondence between features projected onto these surfaces and positions of like features detected in a concurrent image recorded by the feedback camera. The controller can then repeat this process for other planned or calculated scan positions and then compile the resulting depth maps into a 3D map of surfaces within the space.

For example, during a setup period, the system 100 can: initiate a calibration cycle in Block S101; drive the set of azimuth and altitude actuators in the system 100 to a first position associated with a first calibration frame—in a population of calibration frames—to locate the field of view of the light projector and the field of view of the feedback camera in a first scan position corresponding to the first calibration frame in Block S102; project the first calibration frame onto nearby surfaces via the light projector in Block S103; and capture a calibration image—via the optical sensor—of nearby surfaces illuminated with the calibration frame by the light projector in Block S104. The system 100 can then generate a depth map in Block S105 based on the calibration frame, the calibration image, and the known offset between the light projector and the optical sensor.

For example, a calibration frame can include a 1D array of vertically- or horizontally-alternating black and white lines or a 2D grid array of alternating black and white blocks. By projecting this calibration frame into the space, the system 100 can illuminate a 1D array of vertical or horizontal white lines or a 2D grid array of white blocks in a region of the space. While the white lines or blocks appear undistorted—and scaled only—from the perspective of the light projector that projects this calibration frame onto this region of the space, these white lines or white blocks will appear distorted from the perspective of the feedback camera due to physical offset between the light projector and the feedback camera. Therefore, the system 100 can: detect illuminated "white" regions in a calibration image captured by the feedback camera when the corresponding calibration frame is projected onto this region of the space; derive correspondence between individual white regions detected in the calibration image and white regions in the calibration frame; and implement 3D reconstruction techniques to reconstruct a 3D representation (e.g., a 3D point cloud or depth map) of surfaces in this region of the space based on the known offset between the fields of view of the light projector and the feedback camera and differences in relative positions of white regions represented in the calibration frame and the calibration image.

The system 100 can repeat this process for each other calibration frame in the population of calibration frames to generate a set of depth maps defining 3D representations of surfaces in the field of view of the light projector and camera at different azimuth and altitude positions of the projection assembly and/or projection orientation subsystem. The system 100 can then compile this set of depth maps into a localization map of the space in Block S106. Later, when scanning its environment to determine its location, the system 100 can implement similar methods and techniques to project a set of verification frames onto surfaces in the space via the light projector, to capture concurrent verification images via the feedback camera, to construct a 3D representation of its environment from these verification frames and verification images, and to compare this 3D representation to the localization map of this space.

However, in this implementation, because a high-definition representation of the space is captured in the localization map, the system 100 can project a relatively small set of verification frames (e.g., ten verification frames) during this later scan cycle in order to generate a sparse representation of the space. The system 100 can then compare this sparse representation to the high-definition localization map of the space—generated based on a larger population of calibration frames (e.g., 100 calibration frames) projected into the space by the system 100 during the preceding calibration cycle—in order to verify that the system 100 is occupying the space represented by the localization map.

2.2.2 Variation: Stereoscopy with Feedback and Context Cameras

Additionally or alternatively, the controller implements stereoscopy techniques to merge images recorded by the feedback camera with concurrent global images recorded by the context camera to generate a 3D representation of the space.

For example, the controller can: drive the altitude and azimuth actuators to locate the field of view of the feedback camera in a first scan position; record a first pair of concurrent images with the feedback camera and the context camera; and isolate an overlapping area of these concurrent images based on known optical characteristics, optical pathways, and relative positions of the feedback camera and the context camera. The controller can then combine overlapping areas of these concurrent images into a first depth image (e.g., a 3D point cloud) of the space that falls in the fields of view of both the feedback camera and the context camera based on these known optical characteristics, optical pathways, and relative positions of the feedback camera and the context camera. The controller can then: drive the altitude and azimuth actuators to locate the field of view of the feedback camera in a second scan position; generate a second depth image for the second scan position according to similar methods and techniques; and repeat this process for each other scan position in the predefined set of scan positions. The system 100 can then compile these depth images into a spatially-referenced 3D representation of surfaces in the space.

However, the controller can execute any other methods or techniques to generate a 3D representation of the space based on visual content projected into the space and concurrent images recorded by the feedback camera and/or by the context camera during a dedicated calibration routine. Furthermore, the controller can generate this 3D representation of the space in any other form or format.

2.3 Spatial Content Association and Rules

After generating a localization map or other representation of the space based on images captured by the feedback camera during a setup period or other calibration cycle, the system 100 can interface with the user—such as directly or via a computing device (e.g., a smartphone, a tablet)—to link augmented content sources to surfaces in the space in Block S107, as shown in FIG. 2.

In one implementation, the system 100 serves calibration images captured by the feedback camera during calibration cycle to the user's smartphone or tablet, such as directly via a local ad hoc wireless network or via a remote server or computer network. A native application or web browser executing on the user's computing device can then: access these calibration images; render these calibration images; prompt the user to select surfaces and/or draw boundaries around surfaces for augmentation; and prompt the user to link these selected or bounded surfaces to applications enabled at the system 100, applications installed on the user's computing device, and/or other augmented content sources. The user's computing device (or the system 100 or a remote computer system) can then: project a selected or bounded surface specified by the user onto the localization map to locate a 3D position of this surface in the space; and write a link between this surface and the corresponding augmented content source.

The user's computing device can also interface with the user to specify time-based triggers, motion-based triggers, voice-based triggers, and/or contextual triggers, etc. for selectively activating these augmented content sources in this space, as described below. For example, the user's computing device (or the system 100 or the remote computer system) can interface with the user to specify contextual triggers: for projecting ride data from a rideshare application onto a wall near a doorway of the space when a rideshare request is pending in the user's rideshare account; for projecting album art from a music streaming service on a wall over a stereo system in the space when music is streaming from the user's music streaming account to the stereo system.

Alternatively, in a similar implementation, the user's computing device can render the localization map of the space and interface with the user to directly annotate the localization map with surface definitions and augmented content source links.

Additionally or alternatively, the user may place optical fiducials throughout the space, such as stickers containing barcodes or quick-response codes. Similarly, the user may place objects—such as artwork, posters, or books—containing invisible fiducials (e.g., infrared barcodes) throughout the space. The system 100 can then detect these optical fiducials in calibration images captured by the feedback camera during the calibration cycle, define surfaces around these optical fiducials, identify augmented content sources associated with these optical fiducials, and annotate the localization map of the space with links between these augmented content sources and corresponding surfaces represented in the localization map. Additionally or alternatively, the system 100 or the user's computing device can interface with the user to link these optical fiducials to particular augmented content sources, such as described above. Later, the system 100 can selectively project visual content from an augmented content source onto a surface adjacent an optical fiducial thus linked to this augmented content source.

However, the system 100 can implement any other method or technique to link a surface in the space to an augmented content source and to define triggers for projecting visual content from this augmented content source onto this surface. The system 100 can repeat this process for other surfaces in the space and for other augmented content sources enabled at the system 100 (or at the user's computing device) and can store these augmented content source links, surface definitions, and triggers in a rule set associated with this space in Block S108.

2.4 Other Spaces

Later, when the user moves the system 100 to a different space—such as from a living room in her home to a bedroom or kitchen in her home or to her office—the system 100 can repeat the foregoing methods and techniques: to execute a calibration cycle; to generate a localization map of this different space based on data collected by the system 100 during this calibration cycle; to link surfaces in this space to augmented content sources; to define triggers for selectively projecting visual content from these augmented content sources onto these surfaces in this space; and to generate a rule set paired with this localization map for this space.

Therefore, over time, the system 100—such as in conjunction with the user's computing device and/or the remote computer system—can execute the foregoing processes to generate corpus of localization maps of various spaces, wherein each localization map is annotated with locations of surfaces associated with augmented content sources linked to the corresponding space and is paired with a set of rules for transitioning between projecting visual content from these augmented content sources onto corresponding surfaces.

2.5 Space Scan

Block S110 of the first method S100 recites projecting visual content onto nearby surfaces via a light projector integrated into the projector system; and Block S112 of the first method S100 recites capturing a first scan of nearby surfaces, illuminated by the light projector, via an optical sensor integrated into the projector system. Generally, in Blocks S110 and S112, the system 100 can implement methods and techniques similar to those described above to project visual content—such as "verification frames" similar to calibration frames described above—onto nearby surfaces in the space and to capture verification images of these surfaces when illuminated by this visual content during a scan cycle, as shown in FIG. 3A. The system 100 can then generate a representation of the space based on these verification frames and verification images and compare features detected in this representation of the space to localization maps of spaces the system 100 previously occupied (or of spaces previously occupied by other similar systems) to identify the space and retrieve a rule set defined for the space accordingly in Block S120, as described below.

2.5.1 Scan Trigger

In one implementation shown in FIG. 3A, the system 100 executes a scan cycle in Blocks S110 and S112 upon coming to rest after being moved, such as within the same space or between two different spaces. For example, the system 100 can detect motion of itself based on outputs of an inertial measurement unit integrated into the system 100 and/or based on movement of surfaces—previously identified as static or immutable—within the field of view of the feedback camera and/or within the field of view of the context camera over a period of time. Then, in response to detecting cessation of motion of the system 100—such as for a threshold duration of five seconds—following this period of time, the system 100 can automatically initiate a scan cycle in Blocks S110 and S112.

Additionally or alternatively, the system 100 can automatically initiate a scan cycle when the system 100 detects absence of human and/or absence of motion nearby, such as during a scheduled down period (e.g., from 1 AM and 5 PM daily). For example, the system 100 can: implement object-tracking techniques to scan the field of view of the context camera for motion; and then initiate a scan cycle in response to detecting absence of motion in the field of view of the context camera for a threshold duration of time.

Additionally or alternatively, the system 100 can initiate a scan cycle: when manually triggered, such as via a "start" button on the system 100 or via an input into a computing device connected to the system 100; automatically after a threshold period of time (e.g., two days) since a last scan cycle; and/or responsive to any other trigger.

2.5.2 Scan Cycle

In one implementation, the system 100: drives the azimuth and altitude actuators to a first position to locate the field of view of the light projector and the field of view of the feedback camera in a first scan position at a first time; projects a first verification frame (e.g., a 1D or 2D grid array of alternating black and white lines or blocks) onto nearby surfaces via the light projector at the first time; captures a first verification image, via the optical sensor, at the first time; drives the set of actuators to a second position to locate the field of view of the light projector and the field of view of the feedback camera in a second scan position at a second time; projects a second verification frame onto nearby surfaces via the light projector at the second time; captures a second verification image, via the optical sensor, at the second time; and repeats this process for a set of (e.g., eight additional) verification frames. The system 100 can then: generate a first depth map based on the first calibration frame, the first calibration image, and a known offset between the light projector and the optical sensor, such as described above; generate a second depth map based on the second calibration frame, the second calibration image, and the known offset between the light projector and the optical sensor; and repeat this process for other verification images captured by the system 100 during this scan cycle to generate a corpus of depth maps.

Finally, the system 100 can: calculate a gross alignment of these depth maps based on difference between positions of projection assembly and/or the projection orientation subsystem when each of these verification frames was captured; adjust these depth maps to align like features in overlapping regions of these depth maps; and then stitch these aligned depth maps into a three-dimensional representation of the space currently occupied by the system 100.

However, the system 100 can implement any other method or technique to scan the space during a scan cycle, such as according to other processes executed by the system 100 during a calibration cycle as described above. Furthermore, because the localization map generated by the system 100 based on a relatively large quantity of data collected during the calibration cycle defines a high-definition representation of the space, the system 100 can capture a smaller quantity of data (e.g., a ratio of 1:10 of verification images captured during a scan cycle calibration images captured during a calibration cycle) during a scan cycle. The system 100 can then: extract a small number of features from these scan cycle data; detect a similar constellation of analogous features in the high-resolution localization map; and then calculate a transform that maps this small number of features from these scan cycle data to analogous features in the localization map; and thus implement localization techniques to calculate a position of the system 100 relative to the localization map based on this transform.

2.6 Space Identification

Figure 6:
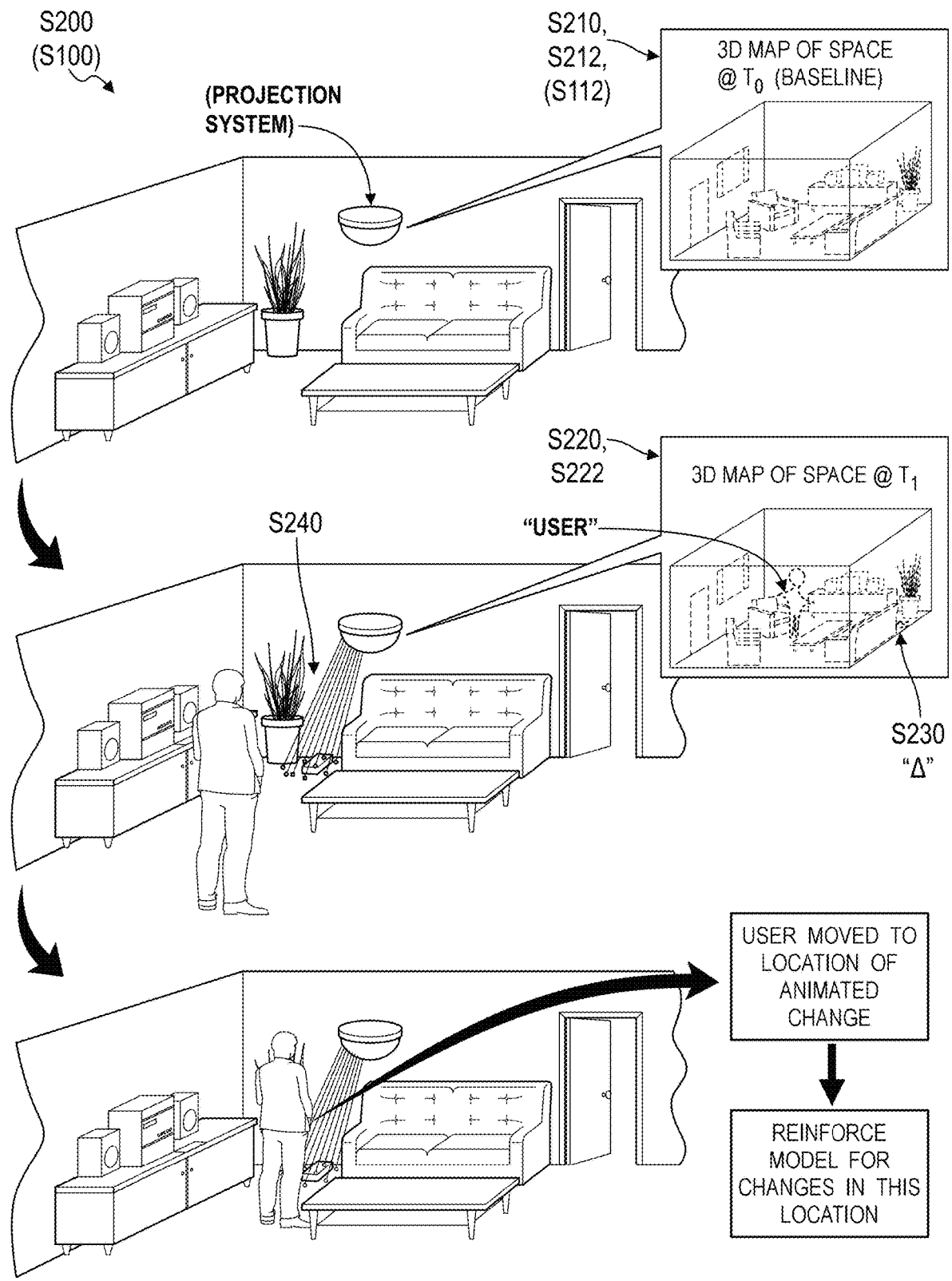
FIG. 6 is a flowchart representation of a second method.

Block S120 of the first method S100 recites identifying a first space occupied by the projector system during the first time period based on features detected in the first scan. Generally, in Block S120, the system 100 can extract a constellation of features from data collected during the scan cycle, compare these extracted features to stored localization maps of spaces previously generated by the system 100 (or by other like systems), and identify the space currently occupied by the system 100 based on alignment of this constellation of features and relative positions of analogous (or "like") features in a stored localization map associated with this particular space, as shown in FIGS. 2 and 6.

For example, after capturing a set of verification images and compiling these verification images and concurrent verification frames into a 3D representation of the space, the system 100 can extract a constellation of features from the first three-dimensional representation. For example, the system 100 can extract a constellation of features representing largest planar surfaces in the 3D representation of the space, such as clusters of points representing: a floor surface or ground plane; a set of non-parallel wall surfaces; a tabletop; and/or a face of a cabinet or credenza. The system 100 can then: access a set of localization maps of spaces previously occupied by the system 100; scan a first localization map, in the set of localization maps, for a set of reference features analogous to the constellation of features; and detect occupation of the system 100 in a first space associated with the first localization map in response to detecting a minimum quantity or proportion of reference features—in the first localization map—that are like (or "analogous" to) the constellation of features approximating constellation of features and arranged in similar relative positions. Otherwise, the system 100 can repeat this process for a next localization map in the set until the system 100 identifies such an analogous set of features in similar relative positions.

However, the system 100 can implement any other localization techniques to identify a particular localization map—in a set of localization maps of spaces previously occupied by the system 100 or by other like systems—representing surfaces analogous to surfaces detected in data captured during the current scan cycle.

In one variation, rather than compare scan cycle data to a localization map to identify the space, the system 100 can instead search these scan cycle data for an optical fiducial (e.g., a quick-response code), object (e.g., artwork), or other indicator unique to and previously associated with a particular space or space type in order to identify the space currently occupied by the system 100.

2.6.1 Stored Scan

In one variation, once the system 100 identifies the space it occupies based on data captured during the current scan cycle, the system 100 updates the localization map of this space with these scan cycle data. In particular, the system 100 can: align the representation of the space thus generated from data collected during the current scan cycle to the localization map of the space; import points or surfaces from the representation of the space—such as points representing large and/or planar surfaces in the space—into corresponding locations in the localization map; and discard adjacent points in the localization map that do not fall on or near the same planes or surfaces. The system 100 can therefore update the localization map to reflect changes in the space, such as movement or replacement of tables, cabinets, and/or shelving in the space. In particular, the system 100 can update the localization map of the space with content from the 3D representation of the space generated from data collected during the last scan completed by the system 100 in order to maintain an accurate representation of the current configuration of the space, such as including presence and current positions of furniture, textiles, and wall art in the space.

Furthermore, the system 100 can discard the representation of a space generated during a previous scan cycle and instead store—such as in local memory or in a local cache—the representation of the space generated during the current scan cycle and leverage this stored representation of the space to monitor and verify its relative position in the space, such as until a next scan cycle.

2.6.2 Failed Space Identification

In another variation shown in FIG. 2A, if the system 100 fails to match data from the last scan cycle to a stored localization map, the system 100 can predict presence in a new, previously-unmapped space. Accordingly, the system 100 can: automatically initiate a calibration cycle as described above; prompt the user to confirm a calibration cycle as described above; or transform these scan cycle data into a localization map of this new space and interface with the user to populate the localization map with links to augmented content sources, as described above.

2.7 Rule Retrieval and Augmented Content Source Selection

Block S132 of the first method S100 recites, in response to identifying the space occupied by the projector system during the first time period, accessing a set of rules defining transitions between augmented content sources in the space. Generally, in Block 132, the system 100 can access rules for projecting content from augmented content sources affiliated with the space, such as including: a list of augmented content sources associated with the space; relative locations of surfaces associated with these augmented content sources; and triggers for projecting visual content from these augmented content sources into the space. In particular, after identifying the space it occupies, the system 100 can retrieve a set of rules previously defined and assigned for this space, such as described above, as shown in FIG. 2A.

2.8 Target Augmented Content Source

Block S130 of the first method S100 recites selecting a first augmented content source, from a first set of augmented content sources affiliated with the first space, associated with a first surface in the first space. Generally, in Block S130, the system 100 can then elect a particular augmented content source—from the set of augmented content source affiliated with this space—based on the set of rules defined for the space, as shown in FIG. 2B.

In one implementation, the system 100 selects a default augmented content source—such as an art augmentation source containing animated visual content aligned to features of a painting, poster, or other wall art in the space—according to the rule set. However, the system 100 can also track the current time and then select an alternate augmented content source assigned a time trigger or time window by the rule set when the current time passes this time trigger or enters this time window. During operation, the system 100 can also detect and track motion in the space, such as by implementing optical flow techniques to detect changes in consecutive images captured by the context camera and/or by the feedback camera. The system 100 can then select an augmented content source—from the set of augmented content source—assigned a trigger based on general motion in the space. Alternatively, the system 100 can discern a location of motion in the space and select a particular augmented content source assigned a trigger based on motion in or near this location in the space.

Similarly, the system 100 can detect and count humans in images captured by the context camera and/or by the feedback camera and select a particular augmented content source assigned a presence-based trigger by the rule set for the space, such as based on: presence of a human; presence of a minimum quantity of humans; or presence of a human a particular location or pose (e.g., sitting on a couch, sitting at a table, crouching in front of a stereo system, standing in a doorway) in the space.

Furthermore, the system 100 can: query the user's mobile device and/or a remote computer system hosting web services linked to the system 100 for statuses of these services; and then select an augmented content source associated with a particular web service when a status of this web service aligns with a corresponding trigger defined in the rule set. The system 100 can similarly receive and respond to inbound notifications or status change prompts from the user's computing device, the remote computer system, or web service.

Furthermore, the system 100 can detect and handle an inbound oral prompt by selecting an augmented content source associated with or specified in this oral prompt. For example, the system 100 can execute an internal virtual assistant or interface with an external virtual assistance executing on the user's computing device or other local or remote device to detect and interpret oral commands from the user, identify a corresponding web service, access visual content from an augmented content source associated with this web service, and then project this visual content onto a corresponding surface in the space.

In one example, when located in a living room, the system 100 can: automatically identify its presence and relative location in this living room; access augmented content from various augmented content sources associated with the living room; project art animations (e.g., from an augmented art source) onto wall art in the living room by default; project album art from a music streaming service onto a wall over a stereo system in the living room when the music streaming service is streaming music to the stereo system; project rideshare status information from a rideshare service onto a wall adjacent a doorway to the living room when a ride is pending in a user profile—of a user affiliated with the system 100—in this a rideshare service; and project a board game interface content (e.g., from a gaming application linked to the system 100) onto a table in the living room when at least two human are detected on opposing sides of the table; and project a video call or video chat interface on a wall in the living room response to a voice command to initiate a video call from a user present in the space. Later, when placed on a countertop in a kitchen, and the system 100 can: automatically identify its presence and relative location in this kitchen; access augmented content from various augmented content sources associated with the kitchen; project calendar event details of upcoming calendar events (e.g., from a online house calendar) onto a wall adjacent a doorway to the kitchen by default; project inbound call information (e.g., from a smartphone connected to the system 100) onto a wall in the kitchen when a call is inbound to phone number linked to the system 100; and project recipe information (e.g., from a webpage accessed by the system 100) onto the countertop in the kitchen when a recipe selected at a native application executing on a user's computing device or through voice commands to the system 100. In this example, when placed on a lamp base in a bedroom, the system 100 can: automatically identify its presence and relative location in this bedroom; access augmented content from various augmented content sources associated with the bedroom; project art animations (e.g., from an augmented art source) onto wall art in the bedroom by default; project yoga and meditation animations (e.g., from a yoga or meditation application linked to the system 100) onto a floor surface in the bedroom when a yoga or meditation application is open and active on the user's computing device; and project visual alarm clock content (e.g., from an alarm clock application executing on a mobile device linked to the system 100) onto a ceiling over a bed in the bedroom when an internal alarm clock in the system 100 is triggered.

Therefore, the system 100 can select an augmented content source—from a set of augmented content source associated with the space—that best fulfills rules defined for this space based on current conditions in the space, at the user's computing device, and/or at web services associated with the system 100 and/or this space.

2.9 Target Surface Selection

The system 100 can then locate a target surface—assigned to the selected augmented content source—in the space relative to the system 100, as shown in FIG. 2B. For example, the system 100 can align the localization map of the space to the 3D representation of the space—generated from data captured during the last scan cycle at the system 100—based on constellations of like features shared between the localization map and this 3D representation. In this example, the system 100 can then project a boundary of the target surface—defined in the localization map for the selected augmented content source—into the 3D representation of the space. Because the 3D representation of the space is referenced to an origin or internal coordinate system of the system 100, the system 100 can thus estimate the position and pose of the target surface relative to the origin or coordinate system of the system 100.

2.10 Projection Parameters

Prior to casting visual content from a particular augmented content source onto a corresponding surface in the space, the controller can also calculate: a) an angular altitude position and an angular azimuth position that locates the projected focal axis of the light projector at the vertical and horizontal center of this surface based on a position of the surface relative to the system 100 as depicted in the 3D representation of the space; b) a warp (e.g., a transform) that preserves a perspective of the visual content (e.g., parallelism of parallel lines, geometry of alphanumeric characters of the same typeface, geometry of iconography) when projected onto the surface with the focal axis of the light projector aligned to the center of the surface based on an orientation and surface flow of the surface depicted in the 3D representation of the space; and c) a projector zoom setting that casts the visual content onto the surface at a target scale based on a depth of the surface from the system 100 as depicted in the 3D representation of the space. The system 100 can then store these angular altitude position, angular azimuth position, warp, and zoom setting values in association with this particular visual content (e.g., visual content of a particular type from a particular source) and the corresponding surface in the space.

2.10.1 Zoom

In one variation, the system 100 also scales-up visual content within a frame and increases projector zoom setting—such as based on both the depth of a corresponding surface to the system 100 and a target projected size of the visual content on the surface—in order to: focus fields of view of a greater quantity of pixels—in the light projector—into the target surface; thus maximize a quantity of pixels in the light projector that illuminate this target surface; and thereby maximize brightness of visual content projected on this target surface.

In a similar implementation, the system 100 can: retrieve a target scaled geometry (e.g., a target width and a target height) of visual content projected onto a corresponding target surface thus defined by the set of rules for the space; and calculate a distance and angular offset from the light projector to this target surface based on a position of the target surface portal from the localization map into the 3D representation of the space generated during the last scan cycle. Based on optical characteristics of the light projector, the system 100 can then: calculate a zoom setting that focuses the field of view of the light projector to the target scaled geometry at the distance of the target surface from the light projector; and store this zoom setting in association with this augmented content source and this space.

The system 100 can repeat this process to calculate such default parameters for other augmented content source and target surface pairs for the space based on the 3D representation of the space.

2.10.3 Real-Time Parameter Calculation

In the foregoing implementations, the system 100 can preemptively calculate these default parameters for each augmented content source affiliated with the space upon conclusion of a scan cycle.

Alternatively, the system 100 can execute this process in (near) real-time after selecting an augmented content source and corresponding target surface to illuminate with visual content from this augmented content source. For example, after completion the scan cycle, the system 100 can: project a position of the target surface—associated with the augmented content source and defined in the localization map of the space—from the localization map into the three-dimensional representation generated from last scan cycle data; and then calculate an offset between the target surface and the current field of view of the light projector based on positions of features in the three-dimensional representation relative to analogous reference features in the localization map of the space and based on a location of the target surface represented in the localization map. The system 100 can also: extract a profile of the target surface—relative to the system 100—from the three-dimensional representation of the space (or from the localization map of the space); and calculate a warp for visual content from projected on this target surface based on this profile in (near) real-time.

2.11 Static Projection

Blocks S140, S142, and S144 of the first method S100 recite: articulating the light projector to locate the first surface in a field of view of the light projector; accessing a first frame from the first augmented content source; and projecting the first frame onto the first surface via the light projector. Generally, when projecting a frame containing visual content onto a target surface in the space (e.g., a temperature of a tea kettle projected onto a coaster on a table a map of a rideshare route projected onto a street map hung on a wall; a virtual game board projected onto a coffee table; an art animation projected onto wall art or freestanding sculpture), the system 100 can: drive the altitude and azimuth actuators to the angular altitude and azimuth positions assigned to this augmented content source for this space in Blocks S140; drive the light projector zoom actuator to the zoom setting assigned to this augmented content source for this space; access a static frame or content feed from the augmented content source in Block S142; apply the warp—calculated for this augmented content source and the corresponding surface in this space—to the un-warped static frame or content feed; and then project the warped static frame or warped content feed onto the target surface in Block S144, as shown in FIG. 2B. The warped static frame or warped content feed thus projected onto the target surface by the system 100 may therefore be perceived by a user as un-warped, as shown FIGS. 4A, 4B, 5, 7, and 8.

In particular, the system 100 can drive the azimuth and altitude actuators to pan and tilt the projection orientation subsystem and/or the projection assembly to target azimuth and altitude positions calculated for the augmented content source and the corresponding target surface in the space in Block S140. The system 100 can also: adjust a zoom of the light projector according to the zoom setting assigned to this augmented content source and the corresponding target surface; and scale the static frame or content feed to fill the field of view of the light projector. The system 100 can then apply a warp—associated with the augmented content source and/or this target surface—to the static frame or content feed and serve this warped static frame or warped content feed to light projector for projection onto the target surface.

2.12 Variation: Auto-Focus

In another variation, the system 100 implements closed-loop controls to verify "crispness" of visual content projected onto a surface in a space based on data collected by the feedback camera.

In one implementation, the system 100: focuses the feedback camera on a surface in a space; projects a first frame onto the surface at a first time; records a first image with the feedback camera at approximately the first time; implements computer vision techniques to detect illuminated surfaces—depicting visual content in the first frame—in the first image; and implements blur detection techniques to characterize sharpness of these illuminated surfaces depicted in the first image. If the system 100 detects blur along the illuminated surfaces, the system 100 can drive a focus actuator—coupled to output optics of the light projector—in a first direction to mechanically adjust focus of the light projector. The system 100 can then: project a second frame on the surface at a second time; record a second image within the feedback camera at approximately the second time; implement computer vision techniques to detect illuminated surfaces—depicting visual content in the second frame—in the second image; and implement blur detection techniques to characterize sharpness of these illuminated surfaces depicted in the second image. If the system 100 detects more blur in the second image than in the first image, the system 100 can drive the focus actuator in a second direction to mechanically adjust focus of the light projector. However, if the system 100 detects more blur in the first image than in the second image but blur is still present in the second image, the system 100 can drive the focus actuator in the first direction to mechanically adjust focus of the light projector. Furthermore, if the system 100 detects no blur or less than a threshold blur in the second image, the system 100 can: hold the current servo position; read the mechanical focus position of the light projector; and store this mechanical focus position in association with the surface, the angular altitude and azimuth positions of the outer reflector at the time the second image was recorded, etc. The system 100 can later drive the focus actuator to this mechanical focus position in preparation for projecting visual content onto this same surface.

Furthermore, in this implementation, the system 100 can also verify that such visual content cast onto the surface by the light projector does not fall on mutable (i.e., moving) surfaces, such as a human occupying the space. For example, when projecting the first frame onto the surface at the first time, the system 100 can also record a global image with the context camera. The system 100 can then: compare this global image to previous global images to detect and track a constellation of mutable objects moving within the space; and project the known field of view of the light projector into the field of view of the context camera based on a known position of the outer reflector relative to the context camera and the current zoom setting of the light projector. If the system 100 detects a mutable object in the field of view of the light projector at the first time, the system 100 can delay the autofocus process described above until no mutable objects are detected in the field of view of the light projector. Alternatively, the system 100 can: project a silhouette of the mutable object detected in the global image into the first image based on a known position of the outer reflector relative to the context camera; crop the projected silhouette of the mutable object out of the first image; crop the first image around the concurrent field of view of the light projector; and then execute the foregoing autofocus process described above in order to detect blur in the remaining area of the first image (i.e., the segment of the first image that intersects the concurrent field of view of the light projector and that excludes silhouettes of mutable objects) and automatically adjust the focus setting of the light projector to reduce blur accordingly.

In another example, the system 100 can: crop the first image around the field of view of the light projector based on the zoom setting of the light projector when the first image was recorded; similarly crop a sequence of images previously recorded by the feedback camera; compare the first cropped image to these preceding cropped images in order to detect changes in types and positions of features in the space up to the current time; isolate a region of the first cropped image in which changes in types and/or positions of features—since a preceding cropped image—are detected; remove this region from the first cropped image; and execute the foregoing process to detect blur in the remaining area of the cropped first image and to automatically adjust the focus setting of the light projector to reduce blur accordingly.

The system 100 can repeat this process to adjust the focus setting of the light projector each time the controller moves the outer reflector to a different position. The system 100 can additionally or alternatively repeat this process when the system 100 detects that all moving objects have exited the field of view of the light projector (e.g., based mutable objects detected in global images recorded by the context camera) and tag this position of the outer reflector with the resulting focus setting. The system 100 can also repeat this process intermittently while the outer reflector is occupying a particular position in order to verify and update focus settings for this particular position.

2.13 Variation: Real-Time Calibration

In one variation, the light projector and the feedback camera are time-synchronized such that the light projector renders a frame concurrently with capture of an image by the feedback camera. In this variation, the light projector and the feedback camera can also project frames and record concurrent images at a frame rate that exceeds typical human ability to resolve visual imagery, such as at a frame rate greater than 30 Hz. While projecting a feed of frames containing visual content onto a corresponding surface in the space, the system 100 can: intermittently inject a calibration frame into a feed served to the light projector such that the calibration frame is unlikely to be perceived for a user occupying the space; record a concurrent calibration image via the feedback camera; and then implement methods and techniques described above to recalculate a depth map or other 3D representation of the surface based on differences between like features in the calibration frame and detected in the concurrent calibration image.

For example, the system 100 can inject a calibration frame into the light projector feed: once per 30 frames for the light projector operating at a frame rate of 30 Hz; twice per 60 frames for the light projector operating at a frame rate of 60 Hz; or three times per 100 frames for the light projector operating at a frame rate of 100 Hz. The system 100 can thus: intermittently output calibration frames into the light projector feed and record concurrent calibration images with the feedback camera over a period of time while the system 100 simultaneously projects other visual content designated for a target surface onto this target surface. The system 100 can then: calculate a depth map for the target surface currently in the field of view of the light projector and the feedback camera according to methods and techniques described above; recalculate a 3D representation of the surface in real-time based on differences between like features in calibration frames and the concurrent calibration images; detect changes between the previous and current 3D representations of the surface; and recalculate a warp that preserves a target perspective of visual content projected onto this surface if such as change is detected. The system 100 can then transition to applying this revised warp to subsequent frames projected onto this surface by the light projector.

2.14 Image Stabilization

In another variation, the system 100 actively stabilizes visual content projected into the space based on subtle change in these visual content relative to reference features detected in a sequence of images recorded by the feedback camera.

In one implementation, the feedback camera records a sequence of images while the light projector casts a concurrent sequence of frames onto a surface in the space. For each image in the sequence of images, the system 100 implements computer vision techniques to detect a reference feature—outside of projected visual content—in the image and stores an (x, y) pixel location of the reference feature. For example, the system 100 can: project the field of view of the light projector onto an image recorded by the feedback camera based on the zoom setting of the light projector at the time the image was recorded; scan the image outside of the light projector field of view for a set of reference features (e.g., one approximately-horizontal edge and one approximately-vertical edge); calculate best-fit lines along the approximately-horizontal and approximately-vertical edges; calculate and store the (x, y) pixel location of the intersection of these best-fit lines; and repeat this process for each other image in the sequence. The system 100 can then calculate a frequency and amplitude of oscillation of the outer reflector and projection assembly relative to the space based on: time intervals between consecutive images recorded by the feedback camera (e.g., 10 milliseconds for the feedback camera and projector operator at a rate of 100 Hz); and changes in the (x, y) pixel locations of the reference feature(s) detected in this sequence of images.

In this implementation, the system 100 can model oscillation of the outer reflector and projection assembly based on these derived frequency, direction, and amplitude values and synchronize this model to the recent measured oscillations of the outer reflector and projection assembly. For each subsequent frame output by the light projector, the system 100 can then shift pixels in the frame vertically and horizontally by an amplitude and direction equal and opposite to the current amplitude and direction of oscillation of the outer reflector and projection assembly predicted by the synchronized oscillation model—such as corrected for a time delay between modification of the frame, rendering of the modified frame by the light projector, and projection of the modified frame onto the surface.

In a similar implementation, the system 100: records a sequence of images via the feedback camera while projecting a sequence of frames onto a surface in the space with the light projector; tracks changes in vertical and horizontal offsets between a first reference feature on the surface and a first projected feature cast onto the surface by the light projector as depicted in this sequence of images; and tracks changes in vertical and horizontal offsets between a second reference feature on the surface and a second projected feature cast onto the surface by the light projector as depicted in this sequence of images. The system 100 can then: model frequencies and amplitudes of vertical oscillation, horizontal oscillation, and oscillation about a roll axis of projected content on the surface based on these changes in vertical and horizontal offsets between the reference features on the surface and features projected onto the surface; synchronize this model to detected oscillations of the projected visual content; translate and rotate subsequent frames opposite the vertical, horizontal, and angular oscillations represented in the model before serving these frames to the light projector; and then project these adjusted frames onto the surface.

The system 100 can repeat the foregoing process during each subsequent projection cycle while the system 100 is in operation in order to update and resynchronize the oscillation model. The system 100 can then apply this updated oscillation model to future frames output by the light projector in order to stabilize projected visual content (i.e., to preserve these projected visual content to the same position on the surface) and thus compensate for small oscillations of the projection assembly and/or outer reflector, which may otherwise result in large oscillations of visual content projected on surfaces at a distance from the system 100.

2.15 Real-Time Global Correction

In a similar variation, the system 100 can implement similar methods and techniques to: detect non-oscillatory shifts in position of projected visual content to a reference feature in the space; and then transform (e.g., translate) a next frame equal and opposite this shift in order to preserve placement of this visual content on the surface despite oscillation of components within the system 100.

2.16 Dynamic Projection

In one variation, the system 100 dynamically moves the projection assembly and/or the projection orientation subsystem to move projected visual content throughout the space and dynamically adjusts a warp and/or other parameters applied to a static frame or content feed from the selected augmented content source in order to maintain a perspective of this content projected into the space. In particular, in this variation, the system 100 can generate a parametric warp model that outputs scale, skew, keystone, and other warp values for a frame as a function of angular altitude and azimuth positions of the outer reflector. The system 100 can then implement this parametric warp model to dynamically recalculate a transform for surfaces in this space and to apply this dynamic transform to a sequence of frames cast onto surfaces in the space as the system 100 sweeps the light projection assembly and/or projection orientation subsystem through a sequence of angular altitude and azimuth positions in order to preserve the perspective of visual content in these projected frames even as the field of view of the light projector moves across surfaces of varying profiles and at varying distances from the system 100.

In one example, the system 100: selects an augmented content source—from a set of augmented content sources affiliated with the space—in response to detecting motion proximal a first surface in the space associated with the augmented content source; and project a static frame or content feed from this augmented content source onto the first surface via the light projector concurrent with motion occurring proximal the first surface. In this example, in response to detecting transition of motion from proximal the first surface to proximal a second surface in the space, the system 100 can: calculate a profile of distances and angular offsets between the system 100 and a region of the space between the first and second surfaces from the 3D representation of the space (recently generated from scan cycle data); extract a surface profile of this region of the space the 3D representation of the space; and calculate a dynamic warp linked to waypoints along this region of the space based of this surface profile. The system 100 can then: dynamically scan the field of view of the light projector from the first surface, across this region of the space, to the second surface; and concurrently adjust the zoom setting of the light projector based on the profile of distances and adjust the warp applied the static frame or content source from the augmented content source synchronized to the position of the field of view of the light projector.

In this variation, the system 100 can therefore implement the foregoing methods and techniques in (near) real-time to dynamically adjust project parameters implemented by the system 100 to sweep visual content from an augmented content source over a region in the space, such as to follow or avoid motion in the space or based on an command (e.g., a voice command or a command entered at a computing device) from the user to shift visual content projected into the space.

2.17 Augmented Content Source Transitions

The system 100 can similarly transition between augmented content sources and projecting visual content from the augmented content sources onto corresponding target surfaces in the space based on changes in the space or other events that trigger rules assigned to the space.

In one example, the system 100: selects an augmented content source—from a set of augmented content sources affiliated with the space—in response to detecting motion proximal a first surface in the space associated with the augmented content source; and project a static frame or content feed from this augmented content source onto the first surface via the light projector concurrent with motion occurring proximal the first surface. In this example, in response to detecting transition of motion from proximal the first surface to proximal a second surface in the space, the system 100 can: select a second augmented content source—from the set of augmented content sources affiliated with the space—associated with the second surface in the space; articulate the light projection assembly or the projection orientation subsystem to transition the field of view of the light projector from the first surface to the second surface; accessing a second frame or second content feed from the second augmented content source; apply a warp calculated for second surface and the second augmented content source to this second frame or second content feed; and project the second warped frame or warped content feed onto the second surface in the space.

In another example, while projecting visual content from a default augmented content source onto a corresponding surface in the space, the system 100 can receive a voice command specifying a second content source in the set of augmented content sources affiliated with this space. Accordingly, the system 100 can: articulate the light projector to locate a second surface, associated with the second augmented content source, in the field of view of the light projector; accessing a second frame or content feed from the second augmented content source; and project the second frame or second or content feed onto the second surface.

However, the system 100 can transition between augmented content sources in response to any other change, event, or trigger.

2.18 Space Change

Later, the user may move the system 100 to a second different space, such as from a living room to a bedroom or kitchen in her home or to her office. The system 100 can then repeat the foregoing methods and techniques to scan its new environment, identify the space it currently occupies, retrieve a rule set for this space, and selectively project visual content from augmented content source associated with this space onto nearby surfaces.

For example, during a first time period, the system 100 can: execute a first scan cycle; compile scan cycle data into a representation of the system 100's current environment; identify a residential living room occupied by the projector system during the first time period based on this representation; select an augmented content source from a music streaming service based on current operation of a stereo system in the residential living room; articulate the light projector to locate a vertical surface proximal the stereo system—linked to the music streaming service—in the field of view of the light projector based on a location of this vertical surface identified in the representation of the space; and project album art—related to a song title currently streamed to the stereo system—onto this vertical surface. During a second, later period of time after the user moves the system 100 out of the residential living room, the system 100 can: execute a second scan cycle; identify a residential kitchen occupied by the projector system during the second time period; select second augmented content source associated from a web browser currently active on the user's computing device; articulate the light projector to locate a horizontal work surface in the residential kitchen—linked to the web browser—in the field of view of the light projector; and then project an image of a webpage (e.g., a webpage containing a cooking recipe)—accessed through the web browser—onto the horizontal work surface via the light projector.

Furthermore, in the foregoing example, the user may return the system 100 to the residential living room at a later time and place the system 100 in a similar—though not necessarily identical—location as the first time period. Thus, upon movement of the system 100 following the second period of time, the system 100 can: execute a third scan cycle; compile scan cycle data into a new representation of the system 100's current environment; identify the residential living room now occupied by the projector system based on this new representation; select an augmented content source from augmented content sources associated with the residential living room; articulate the light projector to locate a surface associated with the selected augmented content source in the field of view of the light projector based on a location of this surface in the new representation of the space; and project visual content from the augmented content source onto this surface.

2.19 Learned Rules

In one variation, the system 100 can the system 100 automatically derives motion-based, time-based, and/or contextual rules for transitioning between augmented content sources in a space based on historical prompts or commands to access visual content from these augmented content sources while the system 100 in present in this space.

For example, the system 100 can implement methods and techniques described above to project visual content from augmented content source responsive to oral commands from a user, responsive to augmented content source selections the system 100 entered by the user at a native application or web browser executing on an external computing device, and/or responsive to status of web services (e.g., a music streaming service, a rideshare service) linked to the system 100. The system 100 can also store times of day, days of the week, presence of humans, ambient light conditions, presence or absence of inanimate objects, and/or other features in the space concurrent with activation or selection of a particular augmented content source at the system 100 when occupying this space. The system 100 can then: implement regression, clustering, or machine learning techniques, etc. to derive correlations between activation of this augmented content source and these features; automatically generate a motion-based, time-based, and/or contextual rule for triggering activation of this augmented content source based on strengths of these correlations; and then store this rule in the rule set for this space.

For example, after operating in a space for a period of time (e.g., days, weeks), the system 100 can: access a corpus of historical times of manual queries for content from an augmented content source in the space; calculate a time trigger for automatic augmentation of the space with content from this content source based on the corpus of historical times; and store the first time trigger in the set of rules for this space. Later, the system 100 can project a reminder frame (e.g., a faint animation of stars or "fairy dust") for this augment content source onto the corresponding surface in the space based on the current time and the first time trigger. Then, in response to receiving manual confirmation to activate the augmented content source—such as in the form of a voice command or a command entered through the user's computing device—the system 100 can access a content feed (e.g., a video) from this augmented content source and projecting this content feed onto this surface.

3. Second Method

As shown in FIG. 6, a second method S200 for augmenting changes in a space with ambient, responsive visual interfaces includes: at a projection system located in the space, recording a first sequence of scans of the space during a first period of time in Block S210; compiling the first sequence of scans into a baseline 3D virtual representation of the space in Block S212; at the projection system, recording a second sequence of scans of the space during a second period of time succeeding the first period of time in Block S220; compiling the second sequence of scans into a second 3D virtual representation of the space in Block S222; detecting a change at a particular location in the space based on a difference between the baseline 3D virtual representation and the second 3D virtual representation of the space in Block S230; and, in response to detecting the change at the particular location and in response to detecting a human occupying the space during a current time, projecting an animation toward the particular location in the space in Block S240.

3.1 Applications

Generally, Blocks of the second method S200 can be executed by a projection system to monitor a space occupied by the projection system for changes and to project animations—such as in the form of slowly-moving white dots (or "fairy dust")—onto these changes in order to draw the attention of a user in this space to this change. In particular, though the projection system may not access or maintain contextual awareness for a change in the space it occupies—such as whether this change is an emptied fruit bowl or a phone lost in a couch—the projection system can execute Blocks of the second method S200 to highlight detected changes in the space, to develop models for predicting relevance of absolute or relative changes and their locations within the space for a user based on user responses to these highlighted changes, and to augment other surfaces in the space with visual content from other content sources, such as responsive to user commands after viewing highlighted changes in the space.

In one example in which the projection system is located in a living room, the projection system can detect a change in the form of a phone left on a couch, keys left on a bookshelf, or a television controller dropped on the floor in the space and then highlight this change automatically by projecting "fairy dust" onto the location of this change in the space, thereby enabling a user to quickly find her phone, her keys, or the television controller. Once the user finds her phone, the user may command the projection system to transition: to projecting a music catalog and album cover art from a music streaming service on a wall area over a stereo system in the living room; or to projecting an artwork animation referenced to features of an artwork hung on a wall within the living room. Alternatively, once the user finds her keys, the user may command the projection system to transition to projecting a planned route and driver status from a rideshare service on a street map hung on a wall within the living room. Yet alternatively, once the user finds the television controller, the user may command the projection system to transition to projecting a video feed and video catalog from a video streaming service over a wall area opposite a sofa within the living room. Therefore, in this example, the projection system can automatically highlight changes in the living room when a user is present and when the projection system is otherwise not actively augmenting the living room with other content requested or scheduled by the user. The projection system can thus: function as a low-intrusion reminder of locations of objects in a space; and therefore segue into accessing other visual content and controls through the projection system.

In a similar example in which the projection system is located in a kitchen, the projection system can detect a change in the form of a low or empty coffee container on a kitchen counter (i.e., a change from a sufficiently-full state to a sufficiently-empty state) and then highlight this change automatically by projecting "fairy dust" onto the location of this coffee container in the space when a user enters the kitchen, thereby reminding the user to order or purchase more coffee. If requested by the user—such as through voice control—the projection system can: access an online store; project a user interface for the online store onto a wall in the kitchen; navigate to a coffee item in the online store responsive to commands from the user; and then place an order and remit payment information for the coffee item to the online store when confirmed by the user. As the user responds to similar augmentation of changes in or near this region of the kitchen with commands to access the online store over time, the projection system can develop a model linking changes in this location to the online store and later automatically project the online store (such as a homepage for the online store or for the coffee item in particular) on the wall in the kitchen when similar changes are detected. The projection system can thus function: as a low-intrusion reminder of changes in states of objects in a space; and therefore segue into an online store purchasing related objects.

The projection system can additionally or alternatively: track content sources for visual content selected by a user for projection onto various surfaces within the space occupied by the projection system; develop a model for projection of content from these content sources into the space, such as based on time of day, day of the week, and/or location of the user within the space; and then selectively project "fairy dust" onto a particular surface in the space when relevance of visual content from a particular content source—previously associated with this particular surface—is predicted by the model in order to remind the user to interface with content from this content source.

In one example in which the projection system is located in a living room, the projection system can store associations between: a first wall to one side of a sofa with a video conferencing service; artwork behind the sofa with an artwork animation; a second wall over a stereo with a music streaming service; a third wall facing the sofa with a video streaming service; a top of a coffee table with an online store; and an open floor area in the living room with a yoga and meditation service. Over time, the projection system can track times of day and days of the week that the user commands the projection system to augment surfaces in the space with visual content from these corresponding services and the location windows occupied by the user immediately before or during projection on this content into the space. Accordingly, the projection system (or a remote computer system) can develop a model for time-based and user-location-based triggers for augmenting the space with visual content from these services. Later, the projection system can project "fairy dust" onto these surfaces in the space responsive to these time-based and user-location-based triggers in order to suggest engagement with visual content from these services, such as: initiating a video call on the wall adjacent the sofa; reading on the sofa while the artwork overhead is animated; selecting an album to replay from a virtual catalog rendered over the stereo; compiling a shopping list within the online store projected onto the coffee table; selecting a film to watch on the wall facing the sofa; or performing a yoga or meditation session with visual guidance projected onto the floor of the room. The projection system (or the remote computer system) can then: project visual content from these services onto corresponding surfaces in the space responsive to confirmation from the user; and refine these time-based and user-location-based triggers responsive to the user's feedback to highlighted surfaces in the space.

Therefore, the projection system can selectively project unobtrusive animations onto objects or surfaces in the space in order to highlight changes in the space, prompt an external user action, and/or trigger a user interaction with visual content from content sources hosted by the projection system, such as based on change-based, time-based, and/or user-location-based triggers developed automatically by the projection system over time.

3.2 Receipt and Installation

To install the projection system in a space, a user or technician may: screw the projection system to a ceiling or overhead beam; install the projection system over a ceiling light receptacle; or install the projection system in place of a ceiling fan in a ceiling fan receptacle in the space; etc. In another implementation, the projection system is mounted on a stand to form an "active" floor lamp or table lamp. In this implementation, the user can place the stand in a space and then install the projection system on the stand.

The user may then interface with the projection system— such as through a web browser or through a native application executing on her mobile device wirelessly connected to the projection system—to link various content sources to surfaces throughout the space, such as described below.

3.3 Space Calibration and Baseline 3D Virtual Representation

Block S2100 of the second method S200 recites, at a projection system located in the space, recording a first sequence of scans of the space during a first period of time; and Block S212 of the second method S200 recites compiling the first sequence of scans into a baseline 3D virtual representation of the space. Generally, once the projection system is installed in a space, the projection system can initiate a calibration routine to scan the space in Block S210 and to construct a baseline 3D virtual representation of the space in Block S212.

In one example, the native application serves a prompt to the user: to adjust the space to a nominal, target, or "goal" condition (e.g., clean with pillows straightened on a sofa, a coffee table clean, and a bookshelf organized); and to then exit the space. When the user confirms that she has exited the space, the native application can return a command to the projection system to execute this first calibration routine.

During the first calibration routine, the projection system can: drive altitude and azimuth actuators to locate fields of view of the projection assembly and the feedback camera in a first scan position; and implement auto-focus techniques described below to focus the projection assembly and the feedback camera. The projection system can then execute a pixel correspondence routine described in U.S. patent application Ser. No. 16/146,679—which is incorporated in its entirety by this reference—to: map a field of view of a pixel in the projection assembly to a field of view of a pixel in the feedback camera for each pixel in the projection assembly; generate a first pixel correspondence map according to the projection assembly-to-camera pixel correspondences; and generate a first disparity map (which may represent distance from the feedback camera to surfaces in the field of view of the feedback camera in this first scan position) for surfaces in the fields of view of the projection assembly in this first scan position. The projection system can then: drive the altitude and azimuth actuators to locate fields of view of the projection assembly and the feedback camera in a second scan position offset from the first scan position; repeat the foregoing process to generate a second pixel correspondence map and a second disparity map for the second scan position; and further repeat this process for each other scan position in a predefined set of scan positions.

For example, the projection system can execute this process to generate one pixel correspondence map and one disparity map for each unique combination of pitch and yaw angles of the outer reflector, including: pitch angles from 0° to 90° in 5° increments; and yaw angles from 0° to 365° in 5° increments. Alternatively, the projection system can implement variable altitude and azimuth increments between scan positions, such as a function of depth to (e.g., proportional to distance to) predominant surface in the field of view of the projection assembly in adjacent scan positions.

The projection system can therefore generate a set of spatially-referenced pixel correspondence maps and disparity maps during a calibration routine. The projection system (or a remote computer system or other device) can then compile these disparity maps into one baseline 3D virtual representation of the space occupied by the projection system. For example, the projection system can stitch disparity maps together based on associated pitch and yaw positions of the outer reflector in order to form a 3D map of surfaces within the space, such as in the form of a triangulated point cloud.

Furthermore, the projection system can identify (and label) a ground plane in the 3D map. For example, the projection system can identify coplanar surfaces spanning the greatest extent of the 3D map as a group plane. In a similar example, the projection system can further include an accelerometer or IMU. The projection system can thus: calculate a direction of gravity relative to the housing based on an output of the accelerometer or IMU; project a vector parallel to gravity into the 3D map; isolate a subset of surfaces in the 3D map that are normal to the gravity vector; identify groups of coplanar surfaces normal to gravity; identify a lowest group of coplanar surfaces normal to gravity as representing a floor surface; and calculate a ground plane that intersects this group of coplanar surfaces.

The projection system can implement similar methods and techniques to detect other vertical or horizontal planar surfaces in the space; later, the native application can prompt the user to augment these planar surfaces with visual content from various external content sources, as described below. For example, the projection system can implement segmentation techniques to automatically detect and distinguish discrete surfaces (e.g., planar surfaces in particular) in the space.

Once the projection system completes this first calibration routine and generates a baseline 3D virtual representation of the space, the projection system can store this baseline 3D virtual representation locally or upload this baseline 3D virtual representation to a remote computer system for remote storage. The projection system (or the remote computer system) can also segment this baseline 3D virtual representation into regions depicting different baseline states of objects or areas in the space. In one example in which the projection system is installed in a living room, the projection system (or the remote computer system) can segment the baseline 3D virtual representation into a floor area, a sofa, a coffee table, a console, a television, and a bookshelf. In a similar example in which the projection system is installed in a kitchen, the projection system segments the baseline 3D virtual representation into floor area, countertop, refrigerator, and dining table regions. The projection system can subsequently monitor some segments in the space for deviation from the baseline conditions but ignore detected changes in other segments of the space.

Furthermore, the projection system can regularly or intermittently repeat the calibration routine in order to update the baseline 3D virtual representation of the space over time, such as during down periods (e.g., from 3 AM to 4 AM every night, once per week, or once per month) and/or when a human is not detected in the space (e.g., not detected in a global image recorded by the context camera).

3.3.1 Variation: Depth Map

In a similar implementation, the projection system stores: known optical characteristics of both the projection assembly and the feedback camera; known optical pathways from the projection assembly and the feedback camera to the outer reflector; and a known offset between the projection assembly and the feedback camera. Therefore, rather than generate a pixel correspondence map and a disparity map that approximates depth of surfaces in the space, the projection system can instead implement similar stereoscopy methods and techniques to calculate a first depth map of surfaces within the fields of view of the projection assembly and the feedback camera—when occupying a first scan position—based on these known optical characteristics, optical pathways, and offsets and correspondence between features projected onto these surfaces and positions of like features detected in a concurrent image recorded by the feedback camera. The projection system can then repeat this process for other planned or calculated scan positions and then compile the resulting depth maps into a 3D map of surfaces within the space.

3.3.2 Variation: Stereoscopy with Feedback and Context Cameras

Additionally or alternatively, the projection system implements stereoscopy techniques to merge images recorded by the feedback camera with concurrent global images recorded by the content camera to generate a baseline 3D virtual representation of the space.

For example, the projection system can: drive the altitude and azimuth actuators to locate the field of view of the feedback camera in a first scan position; record a first pair of concurrent images with the feedback camera and the context camera; and isolate an overlapping area of these concurrent images based on known optical characteristics, optical pathways, and relative positions of the feedback camera and the context camera. The projection system can then combine overlapping areas of these concurrent images into a first depth image (e.g., a 3D point cloud) of the space that falls in the fields of view of both the feedback camera and the context camera based on these known optical characteristics, optical pathways, and relative positions of the feedback camera and the context camera. The projection system can then: drive the altitude and azimuth actuators to locate the field of view of the feedback camera in a second scan position; generate a second depth image for the second scan position according to similar methods and techniques; and repeat this process for each other scan position in the predefined set of scan positions. The projection system can then compile these depth images into a spatially-referenced baseline 3D virtual representation of surfaces in the space.

However, the projection system can execute any other methods or techniques to generate a baseline 3D virtual representation of the space based on visual content projected into the space and concurrent images recorded by the feedback camera and/or by the context camera during a dedicated calibration routine. Furthermore, the projection system can generate this baseline 3D virtual representation of the space in any other form or format.

3.4 Linking Content Sources to Surface

The projection system can then interface with the user—such directly or through the user's mobile device—to link various content sources to surfaces within the space. For example, the native application can aggregate a list of these available content sources for the projection system, such as including: a music streaming service; a video streaming service; a map and geolocation service; an art animation service; a ride share service; an online social network; a text messaging service; a local alarm clock application; an online shopping and fulfillment service; a fitness and exercise service; a calendaring service; a local photo application; a local camera application; a workflow service; and/or a smart home service; etc. The native application can also identify wireless enabled (or "connected," "IoT") devices in or near the space, such as: a television; a stereo; an internet-connected water kettle; an internet-connected thermostat; or another smart appliance; etc. The projection system can then spatially locate visual content from these content sources onto walls, tables, flooring, artwork, and/or other surfaces in the space, such as based on guidance provided by the user via voice commands or through the native application.

However, the projection system can implement any other method or technique to link content sources to surfaces in the space.

3.5 Space Change

Block S220 of the second method S200 recites, at the projection system, recording a second sequence of scans of the space during a second period of time succeeding the first period of time; Block S222 of the second method S200 recites compiling the second sequence of scans into a second 3D virtual representation of the space; and Block S230 of the second method S200 recites detecting a change at a particular location in the space based on a difference between the baseline 3D virtual representation and the second 3D virtual representation of the space. Generally, in Blocks S220 and S222, the projection system can implement methods and techniques described above to rescan the space and to generate an updated 3D virtual representation depicting the current state of the space. In Block S230, the projection system (or the remote computer system) can compare the baseline and current 3D virtual representations to isolate changes in the space.

In one implementation, the projection system subtracts the baseline 3D virtual representation (e.g., in the form of a 3D point cloud) from the current 3D virtual representation (e.g., in the form of a current 3D point cloud) to isolate volumetric changes in the space. The projection system can then characterize the change as: presence of a new object if the volumetric difference between the baseline and current 3D virtual representations is positive; absence of a baseline object if the volumetric difference between the baseline and current 3D virtual representations is negative; or a change in position of a baseline object if the volumetric difference between the baseline and current 3D virtual representations yield mirrored positive and negative volumetric differences. The projection system can then rank these volumetric changes, such as: proportional to magnitude volumetric change; proportional to distance from a user detected in the space; or based on a priority assigned to regions in the space occupied by these changes (e.g., high priority for a floor area and bookshelf, moderate priority for a sofa and coffee table, and low priority for a wall surface). The projection system can also discard or mute changes corresponding to: absence of baseline objects; and changes in position of baseline objects over distances less than a threshold distance (e.g., one meter for small objects, such as magazines and pillows; ten centimeters for large objects, such as a sofa).

Additionally or alternatively, the projection system can normalize color values of points or pixels in the baseline and current 3D virtual representations and then compare these color-normalized representations to isolate color changes in the space. The projection system can then rank these changes, such as: proportional to magnitude color value change; proportional to distance from a user detected in the space; or based on a priority assigned to regions in the space occupied by these changes (e.g., high priority for a floor area and bookshelf, moderate priority for a sofa and coffee table, and low priority for a wall surface).

In yet another implementation, the projection system can implement computer vision, artificial intelligence, deep learning, and/or other techniques within a perception pipeline to detect and identify discrete objects in the space and to generate a constellation of labels representing types and locations of these objects in the space based on the current baseline 3D virtual representation. The projection system can similarly generate a baseline constellation of labels for the space based on the baseline 3D virtual representation and then compare these baseline and current constellations of object labels to detect: presence, types, and locations of new objects; absence of baseline objects of known types; and displacement of baseline objects from baseline locations. The projection system can then rank or prioritize these changes, such as in order of: new objects to baseline objects; magnitude of displacement (greater than a threshold distance) of baseline objects; and then absent objects.

However, the projection system can implement any other method or technique to detect changes in the space from a baseline condition.

3.6 Change Augmentation

Figure 7:
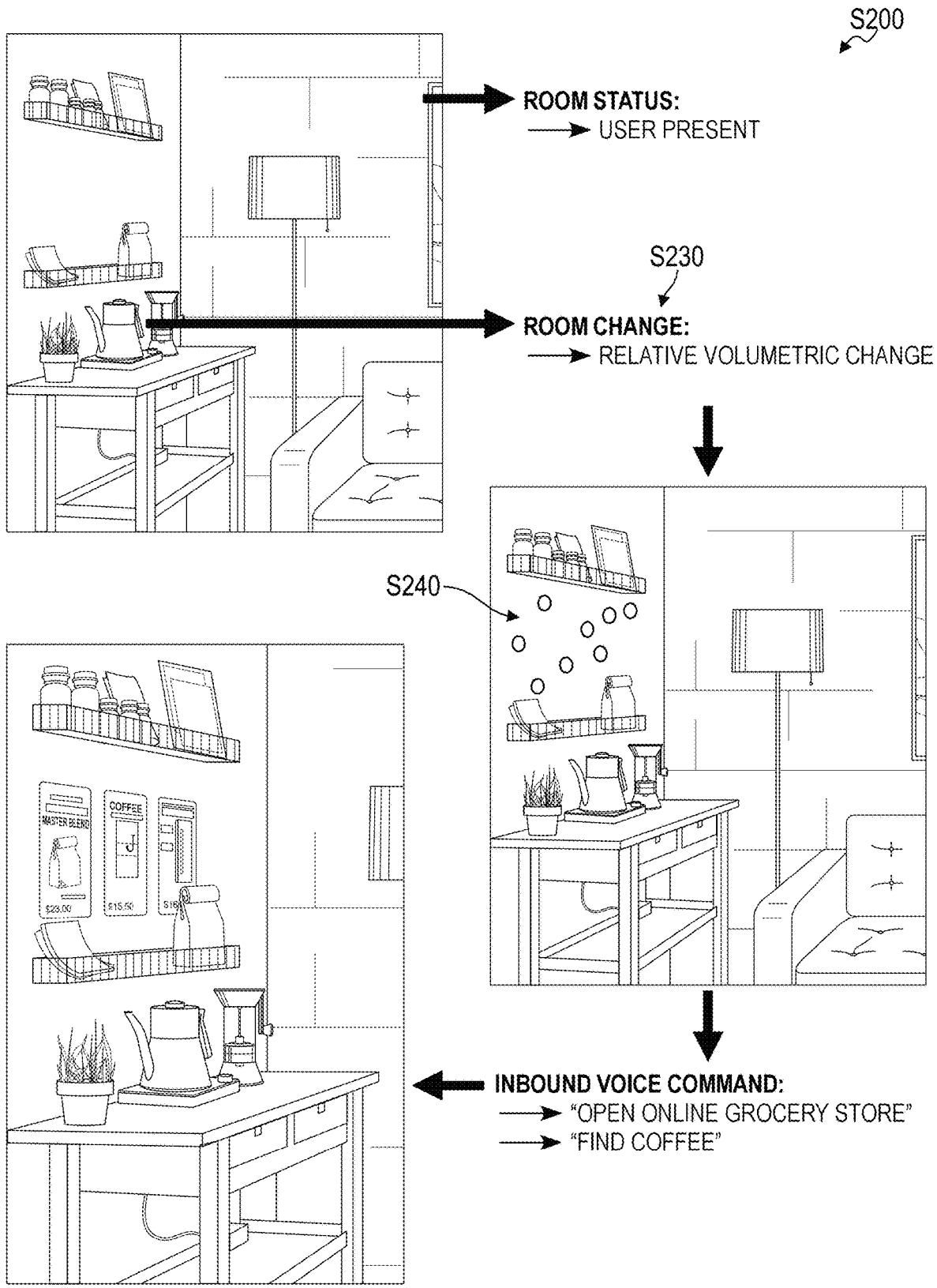
FIG. 7 is a flowchart representation of one variation of the second method.
Figure 8:
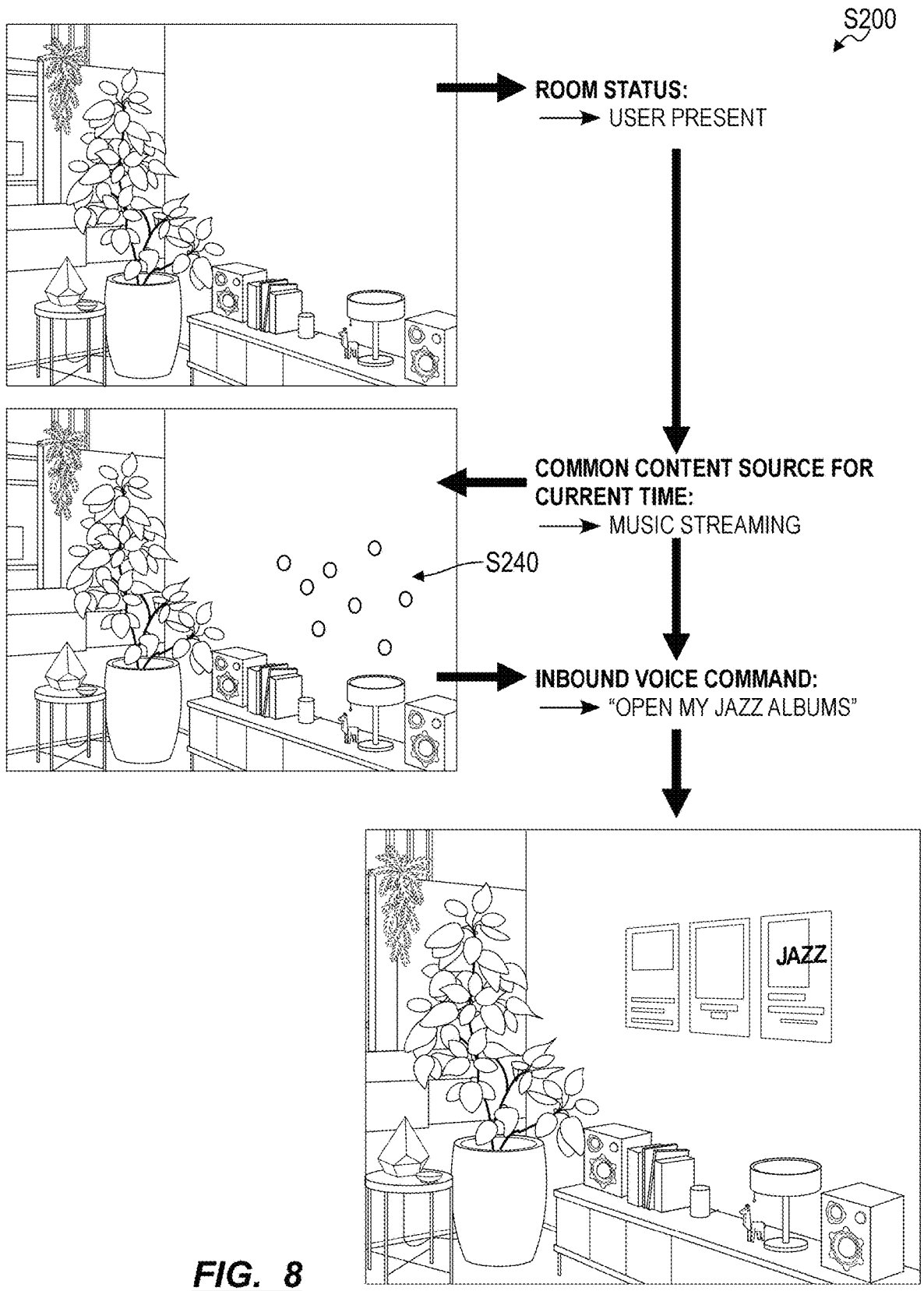
FIG. 8 is a flowchart representation of one variation of the second method.

Block S240 of the second method S200 recites, in response to detecting the change at the particular location and in response to detecting a human occupying the space during a current time, projecting an animation toward the particular location in the space. Generally, in Block S240, the projection system can project unobtrusive animated content—such as in the form of a cluster or bunch of slow-moving white dots—onto or near a change detected in the space in order to subtly draw a user's attention to this change. In particular, if the projection system detects a user present in the space but the projection system is not currently actively projecting visual content from a content source into the space according to a schedule or responsive to a command from the user, the projection system can elect to augment changes detected in the space with (subtle, unobtrusive) animations, as shown in FIGS. 6, 7, and 8.

In one implementation, when the projection system is inactive (i.e., not actively projecting visual content from a content source into the space according to a schedule or responsive to a command from the user), the projection system can passively scan the space for a human, such as by sampling a motion sensor in the projection system to detect motion that may indicate presence of a human or by detecting a human directly in the current 3D virtual representation of the space. If the projection system detects motion or a human present, the projection system can transition to augmented absolute changes in the space. For example, the projection system can project "fairy dust" onto new objects (or positive volumetric changes) in the space—such as keys on a table, a phone on a bookshelf, or a bag on a table in order to assist the user in finding these items in the space—regardless of whether the projection system perceives types or other characteristics of these objects. In another example, the projection system can project "fairy dust" onto locations in the space no longer occupied by common (or "baseline") objects—such as a region of a coffee table typically occupied by a television controller, an empty fruit bowl typically filled with fruit (e.g., as a reminder to purchase groceries), or empty counter space typically stacked with mail (e.g., as a positive reminder of recent effort made cleaning the space)—regardless of whether the projection system perceives types or other characteristics of these objects or regions in the space.

Additionally or alternatively, the projection system can augment regions in the space depicting relative changes, such as: reduction in a volume of coffee grounds in a coffee canister on a counter to below a threshold volume; reduction in volume of a fruit bowl on a counter to below a threshold volume; an increase in a stack of magazines and mail on a counter to above a threshold volume; or a change in position of a sofa greater than a threshold displacement of ten centimeters, regardless of whether the projection system perceives types or other characteristics of these objects or regions in the space. The projection system may therefore draw the attention of the user occupying the space to these changes and prompt the user to action, such as: ordering coffee or groceries through an online store projected into the space by the projection system; reading the mail; or cleaning the space.

3.6.1 Animation Transitions

When animating a change in the space, the projection system can modify content projected onto this change over time. For example, the projection system can project animated "fairy dust" at greater speed, covering a larger area around a change, with increasing dust particle sizes, and/or at greater brightness over time. The projection system can then cease projection of "fairy dust" onto the change at the earliest of: the user muting all animations via a voice command or via her mobile device; the user muting animation of this change in particular; the user responding to the animation by calling the projection system to project visual content from another content source into the space; the user exiting the space; or expiration of a timer (e.g., a one-minute timer). In this example, if the user mutes this animation in particular or if the timer expires while the user is still present in the space, the projection system can transition to animating a different change (e.g., a next-highest-priority change) in the space.

3.7 User Feedback and Learning

The projection system can also: interface with the user responsive to animation of a change in the space; record the user's feedback for this animation; develop or refine a model for importance of types, magnitudes, and/or locations of changes in the space based on the user's feedback; and later selectively animate future changes in the space according to this model.

3.7.1 Explicit Positive Feedback

In one implementation, the projection system records a positive user response to animation of a change. For example, the projection system can project "fairy dust" spanning a one-meter-diameter area over a detected change less than 20 centimeters in maximum dimension (e.g., a smartphone). When the user responds with a voice command "Lightform, show me where," the projection system can animate the "fairy dust" converging on the specific location of the detected difference and then pulse a "star" around this change for a preset duration of time (e.g., ten seconds), until the user commands the projection system to clear the animation, or until the projection system detects the user walking to the location of this change. Accordingly, the projection system can: predict that the change was important to the user based on the user's response; store the location, magnitude, and type of the change (e.g., an object added to or removed from the space); and update a model for the space to reflect greater priority for changes at or near this location, of similar magnitudes, and/or of this type.

In another implementation shown in FIG. 7, upon seeing fairy dust projected onto a change in the space, the user may command the projection system to project visual content from a particular content source into the space. For example, the projection system can animate a detected relative change—corresponding to a drop in the level of coffee grounds in a glass canister on a countertop—in the space. Upon seeing this animation, the user may command the projection system to access an online store. The projection system can then project a user interface for this online store onto an assigned wall in the space, navigate through this online store to a coffee product, and place an order for the coffee product with stored user payment information to the online store based on voice commands from the user. The projection system can then link an identifier for this online store, an identifier for a coffee category, or an identifier for this particular coffee product to the location, magnitude, and/or type (e.g., relative absence) of this change. At a second, later time, upon detecting a change in a similar location and of a similar magnitude and/or type and confirming that a user is present in the space, the projection system can automatically access the online store and project the user interface onto the corresponding wall in the space, thereby reducing a number of inputs required from the user to order this coffee product. If the user again navigates to the same product (or to another product in the same category), the projection system can reaffirm association between the location, magnitude, and/or type of this change and this particular product (or product category). Then, at a third, later time, upon detecting a change in a similar location and of a similar magnitude and/or type and confirming that a user is present in the space, the projection system can automatically access the online store and project a page for the particular product (or product category) onto the corresponding surface in the space, thereby enabling the user to immediately confirm an order for this coffee product. The projection system can further refine an association between the location, magnitude, and/or type of this change and this particular product (or product category, online store) based on the user's response.

Therefore, the projection system can automatically construct associations between states or changes in the space and visual content from various content sources based on the user's oral responses to initial, lightweight projections onto changes detected in the space over time.

In another implementation, the projection system can interface with the native application executing on the user's mobile device to serve a notification to the user when the projection system animates a detected change in the space. The user may then mute the animation projected onto the change via the native application, such as: by swiping right over the notification to mute the projected animation and to indicate that the animation is relevant; or by swiping left over the notification to mute the projected animation and to indicate that the animation is not relevant. The projection system (or the remote computer system) can then confirm or invalidate relevance of this change in the space based on the user's response at the native application and update the model for changes in the space accordingly.

In yet another implementation, the projection system tracks the user's hand gestures while projecting animated content onto a change in the space. If the projection system detects a "thumbs up" gesture by the user, the projection system can confirm relevance of the change and mute the projection. If the projection system detects a "thumbs down" or mute gesture by the user, the projection system can determine that the change is not relevant to the user and mute the projection. The projection system can then update the model for animating changes in the space accordingly.

3.7.2 Implicit Positive Feedback

In a similar implementation shown in FIG. 6, the projection system tracks the user's location in the space while projecting animated content onto a detected change. If the projection system detects that the user has walked over to the location of the projected animation at the detected change, the projection system can confirm relevance of the change to the user—such as unless the user provides explicit feedback that the change is not relevant via a voice command.

However, in this and the foregoing implementations, if the user ignores the animation projected onto a detected change, the projection system can predict that the change is less relevant or not relevant to the user and update the model for animating changes accordingly.

3.7.3 Explicit Negative Feedback

The projection system can also record explicit negative feedback provided by the user—such as a voice command including "don't show me that," "not relevant," or "not helpful, Lightform"—and then update the model for animating changes accordingly.

For example, if the user just cancelled projection of "fairy dust" onto an absolute change in the space and if a user previously cancelled projection of "fairy dust" on or near this same location in the past, the projection system can develop an exclusion zone for changes in and near this location and then avoid augmented changes in this exclusion zone in the future. Similarly, if the user just cancelled projection of "fairy dust" onto a change detected in the space but the user previously responded positively to projection of "fairy dust" onto a change of greater magnitude in or near this same location in the past, the projection system can update the model to reflect a higher magnitude threshold for changes that trigger augmentation in this region of the space.

In another implementation, the user may indicate that a change detected and animated by the projection system represents a "normal" state for this region of the space, such as via a voice command. The projection system can then update the baseline 3D virtual representation of the space to reflect this new "normal" state for this location, such as by injection of a segment of the current baseline 3D virtual representation containing the detected change into the store baseline 3D virtual representation. Alternatively, the projection system can update the baseline 3D virtual representation of the space to reflect an extended range of "normal" for the location of this detected change in the space, such as if the user previously indicated that other absolute or relative changes in this location also represent "normal" conditions in the space.

Later, the projection system can implement similar methods and techniques to selectively project animation imagery (e.g., "fairy dust") onto changes detected in the space based on this updated baseline 3D virtual representation and the model described above.

3.7.4 Pointer

In one variation, when the projection system project animated content onto a surface in the space, the user may interface with a wand to confirm or discard the animated content. For example, the wand can include an infrared emitter or laser diode and can output an infrared signal when handled or when a button on the wand is depressed. In this example, when projecting animated content onto a surface in the space, the projection system can also scan the space (e.g., via the context camera) for infrared light emitted by the wand and determine whether the wand is pointing at the animated content, such as: if infrared light output by the wand is detected on the animated content; or by localizing the position and orientation of the wand based on the position and orientation of the infrared emitter on the wand and implementing ray casting techniques to determine that the wand is pointed at the animated content. If a user handling the wand then gestures—with the wand—to swipe the animated content down or to the left, the projection system can disable projection of this animated content; however, if the user instead gestures—with the wand—to swipe the animated content up or to the right, the projection system can transition to projecting other visual content related to this surface in the space, such as an online retail portal or a video conferencing portal. In this example, the projection system can also move animated or visual content across surfaces in the space responsive to detected motion of the wand directly or motion of emitted infrared light in the space, thereby enabling the user adjust or customize augmentation of the space with animated and visual content through simple manipulation of the wand.

Yet alternatively, the projection system can wirelessly pair with the wand (such as when the wand is handled), can receive commands from the wand responsive to button selections on the wand, and can update animated content projected into the space based on these commands.

3.8 Pull Request

In one variation, a user queries the projection system to highlight changes in a space, such as through a voice command (e.g., "Lightform, help me find . . . "). The projection system can then sequentially project animations onto changes detected in the space, such as in order of change magnitude from large changes to small changes on a three-second interval.

3.9 Variation: Time Spent

In another variation shown in FIG. 8, the projection system tracks times of day and days of the week that projection of visual content from various content sources is requested by the user over time and then develops a model linking content sources to times of day and days of the week.

Later, if the projection system determines that a user is present in the space, the projection system can query this model with the current time of day to determine whether the user has historically requested projection of visual content from a particular content source during similar times of day in the past. If so, the projection system can: identify a particular surface (e.g., a wall) in the space assigned to the particular content source; and then project an unobtrusive animation (e.g., "fairy dust") onto the particular surface in order to subtly remind the user to confirm access to the particular content source. If the user affirms this animation, such as through a voice command, the projection system can transition to projecting visual content from the particular content sources onto this surface and confirm the prediction output by the model to reinforce the model accordingly. Alternatively, if the user mutes the animation and does not elect access to visual content from the particular content source, the projection system can update the model to reduce priority of this time-based prediction for this particular content source. Furthermore, if the user fails to respond to this animation within a threshold duration of time (e.g., two minutes), the projection system can automatically transition to projecting visual content from the particular content sources onto this surface until muted by the user.

In this variation, the projection system can repeat this process to project visual content from different content sources as times linked to different content sources approach.

3.10 Variation: Historical Projected Content

In a similar variation, the projection system tracks locations in the space occupied by the user when projection of visual content from various content sources is requested by the user over time and then develops a model linking user locations in the space to these content sources.

Later, when the projection system detects the user occupying a particular location in the space, the projection system can query this model with the user's current location in order to identify a particular content source selected by the user when occupying this location in the past (or a particular content source selected by the user when occupying this location at similar times of day in the past). The projection system can then: identify a particular surface (e.g., a wall) in the space assigned to the particular content source; and then project an unobtrusive animation (e.g., fairy dust) onto the particular surface in order to subtly remind the user to confirm access to the particular content source. If the user affirms this animation, such as through a voice command, the projection system can transition to projecting visual content from the particular content source onto this surface and confirm the prediction output by the model to reinforce the model accordingly. Alternatively, if the user mutes the animation and does elect access to visual content from the particular content source, the projection system can update the model to reduce priority of this located-based prediction for this particular content source accordingly. Furthermore, if the user fails to respond to this animation within a threshold duration of time (e.g., two minutes), the projection system can automatically transition to projecting visual content from the particular content source onto this surface until muted by the user or until the user moves from the corresponding location.

In one example, the user frequently activates sessions within a yoga application connected to the projection system. During these yoga sessions, the projection system projects visual content related to yoga positions, breathing rate, breathing reminders, timers, relaxation prompts, etc. within a floor area previously assigned to the yoga application, such as a border or perimeter around an open floor area in which the user commonly engages with her practice. In this example, the projection system can track instances in which the user manually activates sessions within the yoga application over time and then implement regression techniques to predict a future time window in which the user is likely to initiate a next session within the yoga application. Later, as this time window approaches, the projection system can project animated waves onto this floor area as a gentle, ambient reminder to the user to return to her practice. When the projection system then projects the user entering this floor area, the projection system can: continue to project these waves on the floor; project an additional menu of guided yoga modules within the floor area near these waves; record selection of one of these guided yoga modules by the user; and then project content from the selected guided yoga sessions—such as prompts related to yoga positions, breathing, and relaxation—into the floor area throughout the remainder of this session.

In this variation, the projection system can repeat this process to project visual content from different content sources responsive to the user moving throughout the space.

The system 100s and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for augmenting surfaces within spaces with projected light comprising:
   at a projector system during a first time period:
      projecting visual content onto nearby surfaces via a light projector integrated into the projector system; and
      capturing a first scan of nearby surfaces, illuminated by the light projector, via an optical sensor integrated into the projector system;
   identifying a first space occupied by the projector system during the first time period based on features detected in the first scan;
   selecting a first augmented content source, from a first set of augmented content sources affiliated with the first space, associated with a first surface in the first space;
   articulating the light projector to locate the first surface in a field of view of the light projector;
   accessing a first frame from the first augmented content source; and
   projecting the first frame onto the first surface via the light projector.

2. The method of claim 1, further comprising:
   at the projector system during a second time period:
      projecting visual content onto nearby surfaces via the light projector; and
      capturing a second scan of nearby surfaces, illuminated by the light projector, via the optical sensor;
   identifying a second space, distinct from the first space, occupied by the projector system during the second time period based on features detected in the second scan;
   selecting a second augmented content source, from a second set of augmented content sources affiliated with the second space, associated with a second surface in the second space;
   articulating the light projector to locate the second surface in the field of view of the light projector;
   accessing a second frame from the second augmented content source; and
   projecting the second frame onto the second surface via the light projector.

3. The method of claim 2:
   further comprising detecting motion of the projector system following the first time period; and
   wherein projecting visual content onto nearby surfaces via the light projector and capturing the second scan of nearby surfaces via the optical sensor during the second time period comprises projecting visual content onto nearby surfaces via the light projector and capturing the second scan of nearby surfaces via the optical sensor in response to detecting cessation of motion of the projector system following the first time period.

4. The method of claim 2:
   wherein identifying the first space occupied by the projector system during the first time period comprises identifying the first space comprising a residential living room occupied by the projector system during the first time period; and
   wherein identifying the second space occupied by the projector system during the second time period comprises identifying the second space comprising a residential kitchen occupied by the projector system during the second time period.

5. The method of claim 4:
wherein selecting the first augmented content source comprises selecting the first augmented content source comprising a music streaming service;
wherein articulating the light projector to locate the first surface in the field of view of the light projector comprises articulating the light projector to locate the first surface, comprising a vertical surface proximal a stereo system in the residential living room, in the field of view of the light projector during operation of the stereo system;
wherein projecting the first frame onto the first surface comprises projecting the first image of album art, related to a song title streamed to the stereo system during the first time period, onto the vertical surface via the light projector;
wherein selecting the second augmented content source comprises selecting the second augmented content source comprising a web browser;
wherein articulating the light projector to locate the second surface in the field of view of the light projector comprises articulating the light projector to locate the second surface, comprising a horizontal work surface in the residential kitchen, in the field of view of the light projector; and
wherein projecting the second frame onto the second surface comprises projecting the second image of a webpage, accessed through the web browser, onto the horizontal work surface via the light projector.

6. The method of claim 1:
wherein articulating the light projector to locate the first surface in the field of view of the light projector comprises:
  calculating a first offset of the field of view of the light projector relative to the first surface; and
  articulating the light projector to a first azimuthal orientation and to a first altitude orientation to locate the first surface proximal a center of the field of view of the light projector based on the first offset; and
further comprising:
  at the projector system during a second time period succeeding the first time period following removal and reentry of the projector system to the first space:
    projecting visual content onto nearby surfaces via the light projector; and
    capturing a second scan of nearby surfaces, illuminated by the light projector, via the optical sensor;
  identifying the first space occupied by the projector system during the second time period based on features detected in the second scan;
  selecting the first augmented content source;
  calculating a second offset of the field of view of the light projector relative to the first surface;
  articulating the light projector to a second azimuthal orientation and to a second altitude orientation to locate the first surface proximal the center of the field of view of the light projector based on the second offset;
  accessing a second frame from the first augmented content source; and
  projecting the second frame onto the first surface via the light projector.

7. The method of claim 1:
wherein projecting visual content onto nearby surfaces via the light projector and capturing the first scan of nearby surfaces via the optical sensor comprises:
  driving a set of actuators in the projector system to a first position to locate the field of view of the projector and a field of view of the optical sensor in a first scan position at a first time;
  projecting a first verification frame onto nearby surfaces via the light projector at the first time;
  capturing a first verification image, via the optical sensor, at the first time;
  driving the set of actuators in the projector system to a second position to locate the field of view of the projector and the field of view of the optical sensor in a second scan position at a second time;
  projecting a second verification frame onto nearby surfaces via the light projector at the second time; and
  capturing a second verification image, via the optical sensor, at the second time;
further comprising:
  generating a first depth map based on the first verification frame, the first verification image, and a known offset between the light projector and the optical sensor;
  generating a second depth map based on the second verification frame, the second verification image, and the known offset between the light projector and the optical sensor; and
  compiling the first depth map and the second depth map into a first three-dimensional representation of nearby surfaces based on a difference between the first position and the second position; and
wherein projecting the first frame onto the first surface via the light projector comprises:
  identifying the first surface in the first three-dimensional representation;
  extracting a profile of the first surface, relative to the light projector during the first time period, from the first three-dimensional representation; and
  projecting the first frame, warped according to the profile of the first surface relative to the light projector, onto the first surface via the light projector.

8. The method of claim 7, wherein identifying the first space occupied by the projector system during the first time period comprises:
accessing a set of localization maps of spaces previously occupied by the projector system;
extracting a first constellation of features from the first three-dimensional representation;
scanning a first localization map, in the set of localization maps, for a first set of reference features analogous to the constellation of features; and
detecting occupation of the projector system in the first space in response to detecting the first set of reference features, analogous to the constellation of features, in the first localization map associated with the first space.

9. The method of claim 7:
further comprising:
  accessing a first projection geometry associated with the first augmented content source in the first space; and
  zooming the field of view of the light projector to approximate the first projection geometry at the first surface; and wherein projecting the first frame onto the first surface via the light projector comprises projecting the first frame, scaled to fill the field of view of the light projector, onto the first surface via the light projector.

10. The method of claim 1:

wherein projecting visual content onto nearby surfaces via the light projector comprises projecting a set of verification frames onto nearby surfaces via the light projector while articulating the field of view of light projector through a range of pan positions;

wherein capturing the first scan of nearby surfaces comprises capturing a first sequence of images of nearby surfaces illuminated with the set of verification frames by the light projector;

further comprising generating a first three-dimensional representation of nearby surfaces based on the first sequence of images;

wherein identifying the first space occupied by the projector system during the first time period comprises:

scanning the first three-dimensional representation for a first set of features analogous to a set of reference features represented in a first localization map of the first space; and identifying the first space based on the first set of features;

further comprising:

projecting a first position of the first surface, associated with the first augmented content source, defined in the localization map of the first space from the localization map of the first space into the first three-dimensional representation; and calculating a first offset between the field of view of the light projector and the first surface based on positions of the first set of features in the first three-dimensional representation relative to analogous reference features in the first localization map of the first space and a location of the first surface represented in the first localization map; and wherein articulating the light projector to locate the first surface in the field of view of the light projector comprises articulating the light projector to reduce the first offset.

11. The method of claim 10:

further comprising, during a setup period preceding the first time period:

for each calibration frame in a population of calibration frames:

driving a set of actuators in the projector system to a position associated with the calibration frame to locate the field of view of the projector and a field of view of the optical sensor in a scan position corresponding to the calibration frame;

projecting the calibration frame onto nearby surfaces via the light projector;

capturing a calibration image, via the optical sensor, of nearby surfaces illuminated with the calibration frame by the light projector; and generating a depth map, in a set of depth maps, based on the calibration frame, the calibration image, and a known offset between the light projector and the optical sensor; and compiling the set of depth maps into the first localization map of the first space; and wherein projecting the set of verification frames onto nearby surfaces via the light projector comprises projecting the set of verification frames, smaller than the population of calibration frames, onto nearby surfaces via the light projector during the first time period.

12. The method of claim 1:

further comprising, in response to identifying the first space occupied by the projector system during the first time period, accessing a first set of rules defining transitions between augmented content sources in the first space;

wherein selecting the first augmented content source comprises selecting the first augmented content source, from the first set of augmented content sources affiliated with the first space, at a first time in the first time period according to a first time trigger defined in the first set of rules for the first augmented content source;

wherein projecting the first frame onto the first surface comprises projecting the first frame onto the first surface via the light projector at the first time; and further comprising:

at a second time during the first time period, detecting motion in the first space via a context sensor integrated into the projector system; and in response to detecting motion in the first space:

selecting a second augmented content source, from the first set of augmented content sources affiliated with the first space, according to the first rule set;

articulating the light projector to locate a second surface, associated with the second augmented content source, in the field of view of the light projector;

accessing a second frame from the second augmented content source; and projecting the second frame onto the second surface via the light projector at the second time.

13. The method of claim 12:

further comprising:

accessing a corpus of historical times of manual queries for content from the first augmented content source in the first space;

calculating the first time trigger for automatic augmentation of the first space with content from the first content source based on the corpus of historical times; and storing the first time trigger in the first set of rules;

wherein projecting the first frame onto the first surface comprises projecting the first frame comprising a reminder frame for the first augment content source onto the first surface via the light projector at the first time based on the first time trigger; and further comprising, at a third time succeeding the first time and preceding the second time:

in response to receiving manual confirmation to activate the first augmented content source, accessing a video from the first augmented content source; and projecting the video onto the first surface.

14. The method of claim 1:

wherein projecting the first frame onto the first surface comprises projecting the first frame onto the first surface via the light projector at a first time during the first time period; and further comprising:

at a second time during the first time period, receiving a voice command specifying a second content source in the first set of augmented content sources; and in response to receipt of the voice command:

articulating the light projector to locate a second surface, associated with the second augmented content source, in the field of view of the light projector;

accessing a second frame from the second augmented content source; and projecting the second frame onto the second surface via the light projector at the second time.

15. The method of claim 1:

wherein selecting the first augmented content source, from the first set of augmented content sources affiliated with the first space, comprises selecting the first augmented content source in response to detecting motion proximal the first surface associated with the first augmented content source;

wherein projecting the first frame onto the first surface comprises projecting the first frame onto the first surface via the light projector concurrent with motion proximal the first surface; and further comprising, during the first time period:

detecting transition of motion from proximal the first surface to proximal a second surface in the first space; and in response to detecting motion proximal the second surface:

selecting a second augmented content source, from the first set of augmented content sources, associated with the second surface in the first space;

articulating the light projector to transition the field of view of the light projector from the first surface to the second surface;

accessing a second frame from the second augmented content source; and projecting the second frame onto the second surface via the light projector.

16. The method of claim 1:

further comprising, during the first time period, scanning a field of view of a context camera integrated into the projector system for motion;

wherein projecting visual content onto nearby surfaces via the light projector and capturing the first scan of nearby surfaces via the optical sensor comprises projecting visual content onto nearby surfaces via the light projector and capturing the first scan of nearby surfaces via the optical sensor during a scan cycle in the first time period in response to detecting absence of motion in the field of view of the context camera for a threshold duration of time; and wherein projecting the first frame onto the first surface via the light projector comprises projecting the first frame onto the first surface via the light projector in response to detecting motion in the field of view of the context camera following the scan cycle.

17. The method of claim 16:

further comprising:

generating a first three-dimensional representation of the first space based on the first scan;

storing the first three-dimensional representation of the first space in replacement of an second three-dimensional representation of the first space generated from a second scan captured by the optical sensor during a second time period preceding the first time period; and wherein articulating the light projector to locate the first surface in the field of view of the light projector comprises:

calculating a first position of the projector system relative to the first surface based on the first three-dimensional representation of the first space; and articulating the light projector to a first azimuthal orientation and to a first altitude orientation to locate the first surface proximal a center of the field of view of the light projector based on the first position of the projector system relative to the first surface.

18. A method for augmenting surfaces within spaces with projected light comprising:

during a first time period:

at a projector system, projecting visual content onto nearby surfaces via a light projector integrated into the projector system;

capturing a first scan of nearby surfaces, illuminated by the light projector, via an optical sensor integrated into the projector system;

identifying a first space occupied by the projector system during the first time period based on features detected in the first scan;

selecting a first augmented content source, from a first set of augmented content sources affiliated with the first space, associated with a first surface in the first space;

articulating the light projector to locate the first surface in a field of view of the light projector;

accessing a first frame from the first augmented content source; and at the projector system, projecting the first frame onto the first surface via the light projector; and during a second time period:

projecting visual content onto nearby surfaces via the light projector;

capturing a second scan of nearby surfaces, illuminated by the light projector, via the optical sensor;

identifying a second space, distinct from the first space, occupied by the projector system during the second time period based on features detected in the second scan;

selecting a second augmented content source, from a second set of augmented content sources affiliated with the second space, associated with a second surface in the second space;

articulating the light projector to locate the second surface in the field of view of the light projector;

accessing a second frame from the second augmented content source; and at the projector system, projecting the second frame onto the second surface via the light projector.

19. The method of claim 18:

further comprising detecting motion of the projector system following the first time period; and wherein projecting visual content onto nearby surfaces via the light projector and capturing the second scan of nearby surfaces via the optical sensor during the second time period comprises projecting visual content onto nearby surfaces via the light projector and capturing the second scan of nearby surfaces via the optical sensor in response to detecting cessation of motion of the projector system following the first time period.

20. The method of claim 18:

wherein projecting visual content onto nearby surfaces via the light projector and capturing the first scan of nearby surfaces via the optical sensor comprises:

- driving a set of actuators in the projector system to a first position to locate the field of view of the projector and a field of view of the optical sensor in a first scan position at a first time;
- projecting a first calibration frame onto nearby surfaces via the light projector at the first time;
- capturing a first calibration image, via the optical sensor, at the first time;
- driving the set of actuators in the projector system to a second position to locate the field of view of the projector and the field of view of the optical sensor in a second scan position at a second time;
- projecting a second calibration frame onto nearby surfaces via the light projector at the second time; and
- capturing a second calibration image, via the optical sensor, at the second time;

further comprising:

- generating a first depth map based on the first calibration frame, the first calibration image, and a known offset between the light projector and the optical sensor;
- generating a second depth map based on the second calibration frame, the second calibration image, and the known offset between the light projector and the optical sensor; and
- compiling the first depth map and the second depth map into a first three-dimensional representation of nearby surfaces based on a difference between the first position and the second position; and wherein projecting the first frame onto the first surface via the light projector comprises:

- identifying the first surface in the first three-dimensional representation;
- extracting a profile of the first surface, relative to the light projector during the first time period, from the first three-dimensional representation; and
- projecting the first frame, warped according to the profile of the first surface relative to the light projector, onto the first surface via the light projector.

* * * * *